United States Patent
Khan et al.

(10) Patent No.: US 11,327,187 B2
(45) Date of Patent: May 10, 2022

(54) FUNCTIONAL QUANTIZATION BASED DATA COMPRESSION IN SEISMIC ACQUISITION

(71) Applicant: King Fahd University of Petroleum and Minerals, Dhahran (SA)

(72) Inventors: Hamood Khan, Dhahran (SA); Salam A. Zummo, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 674 days.

(21) Appl. No.: 16/364,680

(22) Filed: Mar. 26, 2019

(65) Prior Publication Data

US 2020/0309976 A1    Oct. 1, 2020

(51) Int. Cl.
*G01V 1/28*    (2006.01)
*G06K 9/62*    (2022.01)

(52) U.S. Cl.
CPC ............. *G01V 1/28* (2013.01); *G06K 9/6267* (2013.01); *G01V 2210/38* (2013.01); *G01V 2210/42* (2013.01)

(58) Field of Classification Search
CPC .. G01V 1/28; G01V 2210/38; G01V 2210/42; G01V 1/22; G01V 1/36; G01V 2210/50; G01V 1/18; G06K 9/6267; H03M 7/30; G06T 9/008
See application file for complete search history.

(56) References Cited

U.S. PATENT DOCUMENTS

| | | | |
|---|---|---|---|
| 6,594,394 B1* | 7/2003 | Stromberg | G01V 1/247 382/232 |
| 8,990,217 B2* | 3/2015 | Jagmohan | H03M 7/3084 707/741 |
| 11,153,587 B2* | 10/2021 | Haimi-Cohen | H04N 19/426 |

FOREIGN PATENT DOCUMENTS

| | | |
|---|---|---|
| CN | 104200510 A | 12/2014 |
| CN | 107942377 A | 4/2018 |
| GB | 1 363 346 | 8/1974 |

OTHER PUBLICATIONS

Burns; Centroidal Voronoi Tessellations ; 2009 ; 22 Pages.

(Continued)

*Primary Examiner* — Mischita L Henson
(74) *Attorney, Agent, or Firm* — Oblon, McClelland, Maier & Neustadt, L.L.P.

(57) ABSTRACT

Seismic acquisition having high geophone densities is compressed based on Functional Quantization (FQ) for an infinite dimensional space. Using FQ, the entire sample path of the seismic waveform in a target function space is quantized. An efficient solution for the construction of a functional quantizer is given. It is based on Monte-Carlo simulation to circumvent the limitations of high dimensionality and avoids explicit construction of Voronoi regions to tessellate the function space of interest. The FQ architecture is then augmented with three different Vector Quantization (VQ) techniques which yield hybridized FQ strategies of 1) FQ-Classified VQ, 2) FQ-Residual/Multistage VQ and 3) FQ- (Continued)

Recursive VQ. Joint quantizers are obtained by replacing regular VQ codebooks in these hybrid quantizers by their FQ equivalents. Simulation results show that the FQ combined with any one of the different VQ techniques yields improved rate-distortion compared to either FQ or VQ techniques alone.

20 Claims, 15 Drawing Sheets

(56) References Cited

OTHER PUBLICATIONS

Savazzi, et al. ; Compression and coding for cable-free land acquisition systems ; Geophysics vol. 76, No. 5 ; Sep.-Oct. 2011 ; pp. q29-q39 ; 11 Pages.
Averbuch, et al. ; Low Bit-Rate Efficient Compression for Seismic Data ; IEEE Transactions on Image Processing, vol. 10, No. 12 ; Dec. 2001 ; 14 Pages.
Rubin, et al. ; Lossy Compression for Wireless Seismic Data Acquisition ; IEEE Journal of Selected Topics in Applied Earth Observations and remote Sensing vol. 9, No. 1 ; Jan. 2016 ; 17 Pages.
Renesas ; Automatic Gain Control (AGC) in ISL5416 2G QPDC ; May 2002 ; 14 Pages.

* cited by examiner

300

FUNCTIONAL QUANTIZATION BASED DATA COMPRESSION IN SEISMIC ACQUISITION

BACKGROUND

Technical Field

The present disclosure is directed to a system and methods for data compression of reflected seismic waveforms received from seismic sensors using functional quantization.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Seismic waves can be generated by many different sources and their reflections from geological boundaries are analyzed to determine characteristics of the structure through which the waves pass. Seismic waves are reflected from areas where a property, such as density or elasticity, of the geologic structure changes. The reflected waves are received by seismic receivers, which can take the form of geophones, hydrophones, acoustic sensors, seismometers, microphones, and any other device for receiving seismic or acoustic waves.

In a land based seismic survey, a possible seismic energy source could be a vibrator truck or dynamite on the ground surface. The vibrator creates vibrations (shots) in the ground, which are referred to as seismic waves. The waves reflect from the discontinuities in the substrate and are received by a number of seismic receivers. The receivers, such as geophones, are spaced out at regular intervals on the ground and receive the reflected seismic waves.

Alternatively, the seismic energy source may be deployed under water. Marine seismic surveys typically employ a submerged seismic energy source towed by a ship and periodically activated to generate an acoustic wavefield. The seismic source generating the wavefield may be of any type, including a small explosive charge, an electric spark or arc, a marine vibrator or a gun. The seismic source gun may be a water gun, a vapor gun, and, most typically, an air gun. Typically, a marine seismic energy source consists not of a single source element, but of a spatially-distributed array of source elements.

Further, the seismic source may be generated by earthquakes, volcanic eruptions, nuclear explosions, or any geologic disturbance which produces acoustic waves.

When the reflected wave data is received by the seismic receivers, such as an array of geophones, the data must be communicated to a processing station over a communications channel, such as a satellite communications channel, which might have a very limited bandwidth compared to the bandwidth needed to carry such high data rates, Therefore, it is desirable to represent the important features of the directional acoustic data in less than the full data rate, a process called compression.

Seismic data offers both opportunities and challenges for compression. An aspect that makes a seismic signal easy to compress is the high amount of memory in the seismic source arising because of signal correlation within traces, across traces and across shots. The challenging aspects are the high dynamic range and high levels of coherent noise in raw seismic signals. Further, there are only a few analytical models for determining a statistical characterization of seismic images that describe general seismic sources. This makes it difficult to design compression algorithms that require knowledge of the source statistical distribution. One way to circumvent this difficulty is to use universal compression algorithms, where a compression algorithm is designed to work optimally for an entire class of sources rather than a specific source. However, universal compression algorithms are designed to work well only under the assumption that the cardinality (i.e, the number of elements in a set) of the source alphabet is small compared to the length of the sequence to be compressed. (See A. Orlitsky, N. P. Santhanam and Junan Zhang, "Universal compression of memoryless sources over unknown alphabets," in *IEEE Transactions on Information Theory*, vol. 50, no. 7, pp. 1469-1481, July 2004, and Storchak et al.,"Standard nomenclature of seismic phases" Information Sheet, 2002, IASPEI Commission on Seismological Observation and Interpretation, http://gfzpublic.gfz-potsdam.de/pubman/item/escidoc: 152435/component/escidoc:152589/IS_2.1.pdf, each incorporated herein by reference in its entirety).

As a result of the high dynamic range (at least 24 bits) of the traces in a seismic gather and because source letters with high amplitude do occur with small but non-vanishing probabilities, this assumption is violated and universal compression of seismic data leads to low compression ratios (usually about 3-4) in a lossless or near-lossless setting. A source letter from a geophone is the 24 or 32 bit sample of the geophysical signal captured by the geophone.

Previous work on compression for seismic signal fields has largely focused on algorithms adapted from traditional centralized, transform-based, image compression techniques. (See J. D. Villasenor, R. A. Ergas and P. L. Donoho, "Seismic data compression using high-dimensional wavelet transforms," *Data Compression Conference,* 1996. DCC '96. Proceedings, Snowbird, Utah, 1996, pp. 396-405; A. Z. Averbuch, F. Meyer, J. O. Stromberg, R. Coifman and A. Vassiliou, "Low bit-rate efficient compression for seismic data," in IEEE Transactions on Image Processing, vol. 10, no. 12, pp. 1801-1814, December 2001; Rsten T, Ramstad T A, Amundsen L. "Optimization of subband coding method for seismic data compression." Geophysical Prospecting 2004 Sep. 1; 52(5):359-78; W. Wu, Z. Yang, Q. Qin and F. Hu, "Adaptive Seismic Data Compression Using Wavelet Packets," 2006 *IEEE International Symposium on Geoscience and Remote Sensing*, Denver, Col., 2006, pp. 787-789; M. A. Al-Moohimeed, "Towards an efficient compression algorithm for seismic data," 2004 *Asia-Pacific Radio Science Conference,* 2004. Proceedings., 2004, pp. 550-553; M. Radosavljevi, Z. Xiong, L. Lu and D. Vukobratovi, "High bit-depth image compression with application to seismic data," 2016 *Visual Communications and Image Processing (VCIP)*, Chengdu, 2016, pp. 1-4; and L. C. Duval, Van Bui-Tran, T. Q. Nguyen and T. D. Tran, "Seismic data compression using GenLOT: towards "optimality"?," *Proceedings DCC* 2000. Data Compression Conference, Snowbird, Utah, USA, 2000, pp. 552, each incorporated herein by reference in its entirety). In J. D. Villasenor et al. (1996), a wavelet transform on high-dimensional seismic data sets was carried out. Various wavelet and local cosine transforms algorithms described in A. Z. Averbuch et al. (2001) represent the current standard widely used by exploration seismology industry. Rsten T. et al. (2004) analyzes sub band coding methods for seismic data. W. Wu et al. (2006) and M. S. Al-Moohimeed (2004) give wavelet-packet methods for seismic data compression. In M. Radosavljevi et al. (2016) the algorithms used for intra-coding of video frames in High Efficiency Video Coding (HEVC) standard are used to compress the high-bit depth data sets of a seismic image. L. C. Duval et al. (2000) introduces the Generalized Lapped Orthogonal Transform (GenLOT) for seismic compression. GenLOT is a generalization the wavelet transform.

A distributed scheme for signal compression in geophone networks was presented in Savazzi et al. (2011). A linear predictive coding together with the automatic gain control (AGC) is used to compress seismic data in the network. (See Stefano Savazzi and Umberto Spagnolini, "Compression and coding for cable-free land acquisition systems", Geophysics, vol. 76, No. 5, 2011. GYSICS. VOL. 76, NO. 5 (September-October 2011), incorporated herein by reference in its entirety).

A study of compression algorithms employed in an actual geophone network comparing various simple, real-time, on-mote (using real hardware) lossy compression schemes was done on the basis of compression ratios, reconstructed SNR, power consumption and execution time of the compression algorithm. (See M. J. Rubin, M. B. Wakin and T. Camp, "Lossy Compression for Wireless Seismic Data Acquisition," in *IEEE Journal of Selected Topics in Applied Earth Observations and Remote Sensing*, vol. 9, no. 1, pp. 236-252, January 2016, incorporated herein by reference in its entirety).

Since seismic data contains considerable redundancy in the source signal, vector quantization methods have been used to exploit this redundancy as per the tenets of information theory. (See Thomas M. Cover, Joy A. Thomas, *Elements of Information Theory*, Wiley Series in Telecommunications and Signal Processing, 2006, incorporated herein by reference in its entirety).

Functional quantization (FQ) is the transposition of a finite dimensional vector quantization problem to an infinite dimensional setting. It has recently been studied by researchers in financial mathematics to obtain a quantized approximation to the sample path followed by a stock value price, for example. (See G. Pags, J. Printems, "Optimal quantization for finance: from random vectors to stochastic processes," in: P. G. Ciarlet (Ed.), *Handbook of Numerical Analysis, vol. XV, Special Volume: Mathematical Modeling and Numerical Methods in Finance*, North-Holland, 2008, pp. 595648, incorporated herein by reference in its entirety). FQ also has application to numeric and stochastic calculus problems. (See G. I. Schuller, "A state-of-the-art report on computational stochastic mechanics," *Probab. Eng. Mech.* 12 (4) (1997) 197321.958 M. J. Miranda, P. Bocchini/ Applied Mathematics and Computation 271 (2015) 935958; R. Ghanem, P. D. Spanos, *Stochastic Finite Elements: A Spectral Approach*, revised, Dover, 2003, each incorporated herein by reference in their entirety).

From a theoretical viewpoint, FQ is a very general paradigm. Its application is independent of whether the random process under consideration is Gaussian, non-Gaussian, stationary or non-stationary. (See H. Luschgy, G. Pages, "Functional quantization of a class of Brownian diffusions: a constructive approach," *Stoch. Process. Appl.* 116 (2) (2006) 310336, incorporated herein by reference in its entirety).

In functional analysis, the sample paths of a random process (RP) are mapped onto functions—the "code points" of the quantizer—in a certain function space. The main results that have been established in the FQ literature are the existence of an optimum quantizer in the mean square error sense and the asymptotic decay rates for the quantization error. (See H. Luschgy, G. Pages, "Functional quantization of Gaussian processes," *J. Funct. Anal.* 196 (2) (2002) 486531; and H. Luschgy, G. Pages, "Sharp asymptotics of the functional quantization problem for Gaussian processes," *Ann. Probab.* 32 (2) (2004) 15741599, each incorporated herein by reference in their entirety).

To date there has been no effort to apply the FQ paradigm to data compression. Using FQ provides a number of advantages, the primary being that the encoding complexity of the quantizer reduces from being exponential to polynomial in FQ. The cost is loss of quality, as the fine structure of the signal is lost because in FQ, code points are obtained through averaging—which smooths them out. However, when used in conjunction with classified quantization, FQ proves to be a much more effective technique in terms of compression performance.

The present disclosure provides an improvement over previous methods for seismic surveying including compression of seismic waves by using a lossy scheme of compressing the seismic data. The seismic data is compressed by direct vector quantization in infinite dimensions, which is distinguished from the previous approaches of modifying existing algorithms for image compression. Functional quantization (FQ) is used to map the sample paths of a random process (RP) onto functions—the "code points" of the quantizer—in a specified function space to compress the data.

SUMMARY

An embodiment of the present disclosure describes a system for seismic surveying including data compression of reflected seismic waveforms received from seismic sensors. A lossy scheme of compressing the seismic data based on direct vector quantization in infinite dimensions is used. Vector quantization methods are used to exploit the redundancy of the source signals. The issue of a large source alphabet (usually seismic data has 24-bit depth giving rise to a very large source alphabet) is handled through the use of Automatic Gain Control (AGC) of the amplitude profile of the signal. The AGC profile is then losslessly coded using an arithmetic code and passed as side information to a decoder or recorder unit.

Functional quantization, FQ, is used to transpose the finite dimensional vector of the seismic source signals to an infinite dimensional setting. Functional analysis is used to map the sample paths of the random process, RP, onto functions, which are the code points of the quantizer in the seismic function space. The output from the AGC quantization is the compressed seismic data.

A second embodiment to a method for performing seismic surveying including data compression of reflected seismic waveforms received from seismic sensors is described. The sensor data is compressed by vector quantization followed by functional quantization to determine codebook classes. The codebook classes are then applied to a classified vector quantizer. Optionally, the results from the classified vector quantization may be applied to one of a multistage vector quantizer and a recursive vector quantizer.

A third embodiment to a non-transitory computer readable medium having instructions stored therein that, when executed by one or more processors, causes the one or more processors to perform a method for performing seismic surveying including data compression of reflected seismic waveforms received from seismic sensors is described. The processor compresses the sensor data using by vector quantization followed by functional quantization to determine codebook classes. The codebook classes are then applied to a classified vector quantizer. Optionally, the results from the classified vector quantization may be applied to one of a multistage vector quantizer and a recursive vector quantizer.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

Compression Ratio of the FQ-VQ, FQ and LBG VQ quantizers on the simulated 3D wavefield.

Figure 11:
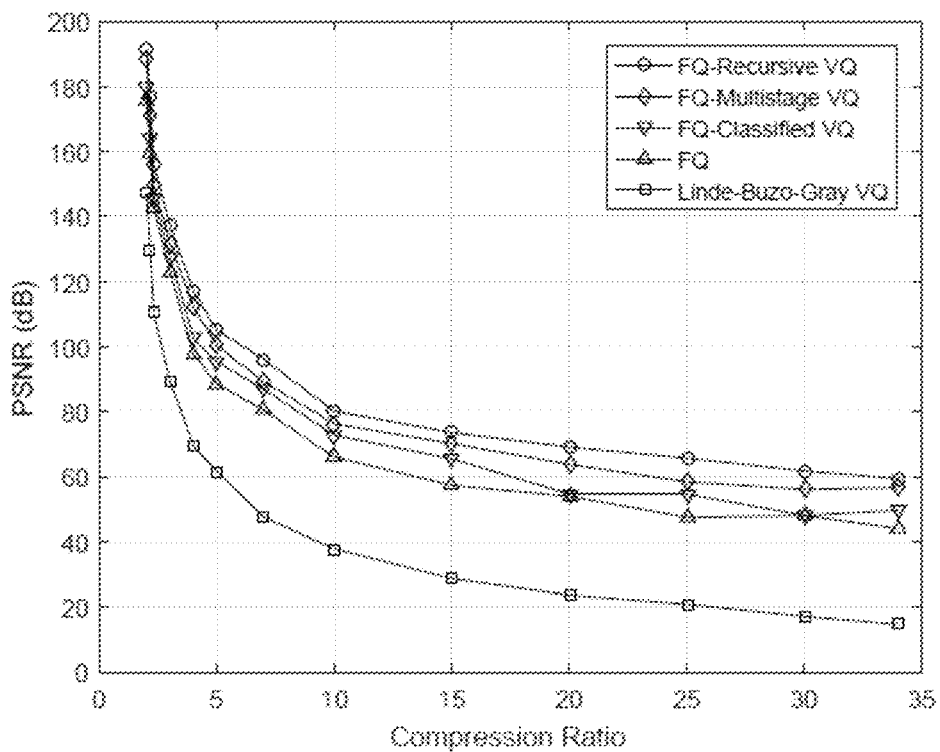

FIG. 11 is a graph illustrating compression performance in terms of PSNR vs. Compression Ratio of the FQ-VQ, FQ and LBG VQ quantizers on the synthetic 3D wavefield.

Figure 12:
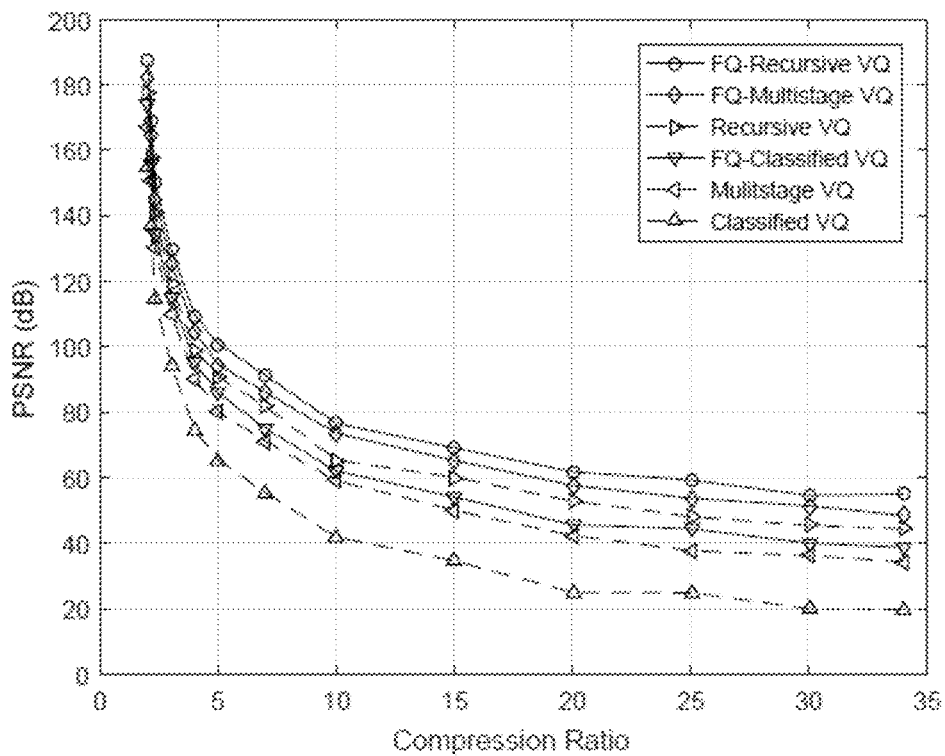

FIG. 12 is a graph illustrating PSNR performance gains obtained by using FQ-hybridized versions of standard VQ schemes.

Figure 13:
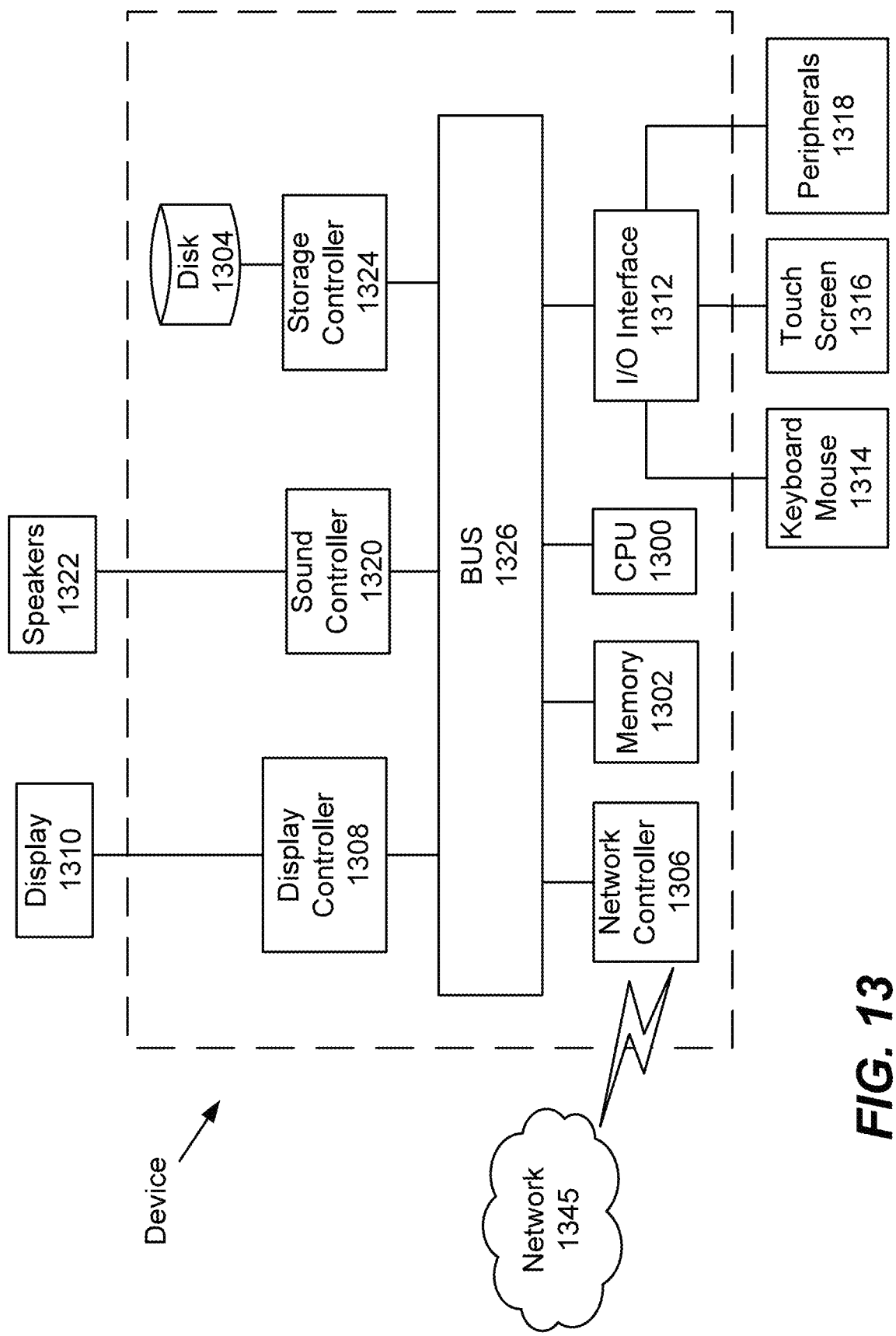

FIG. 13 shows hardware for the computing device used in the exemplary embodiments.

Figure 14:
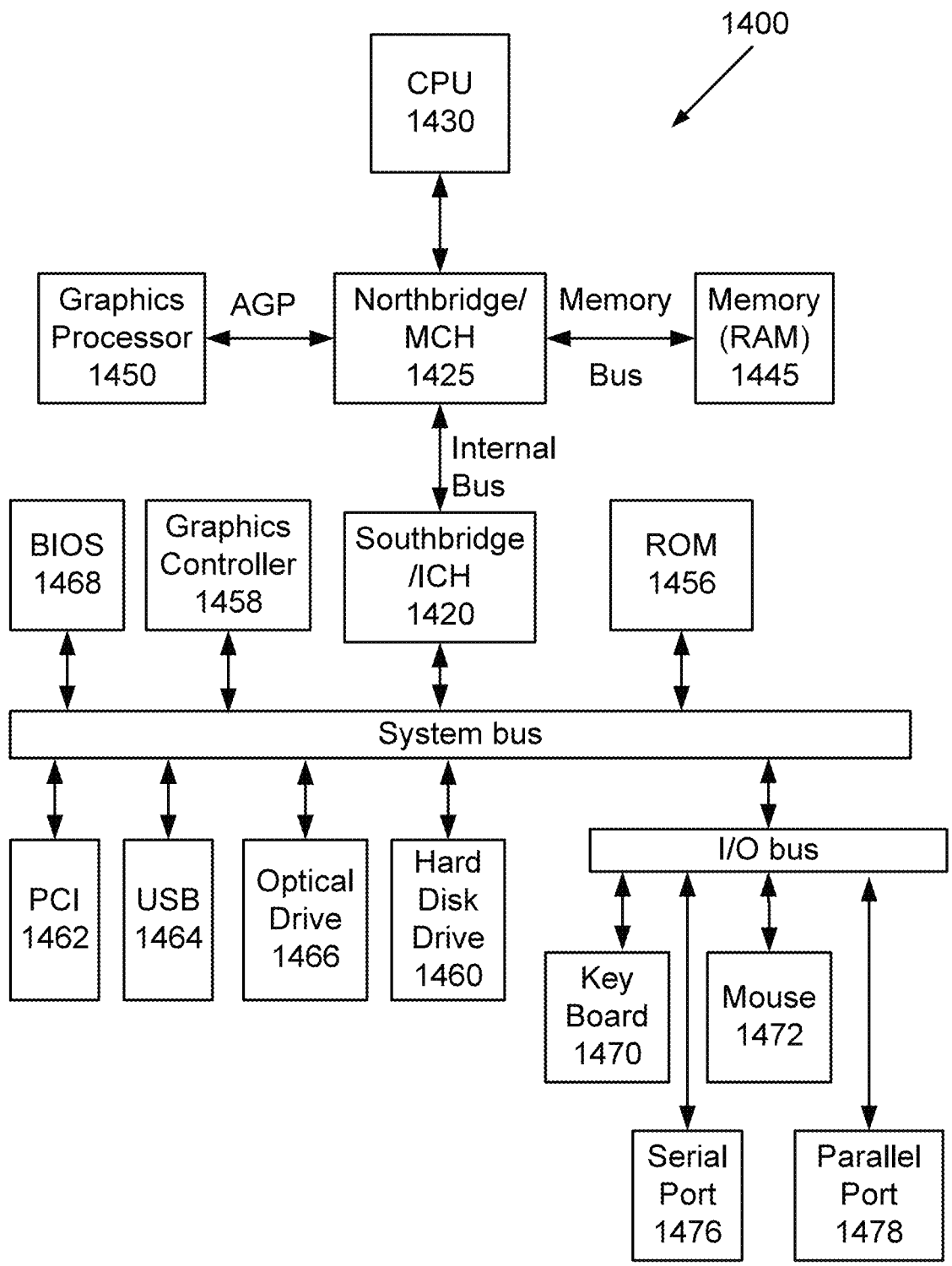

FIG. 14 illustrates a data processing system used in the exemplary embodiments.

Figure 15:
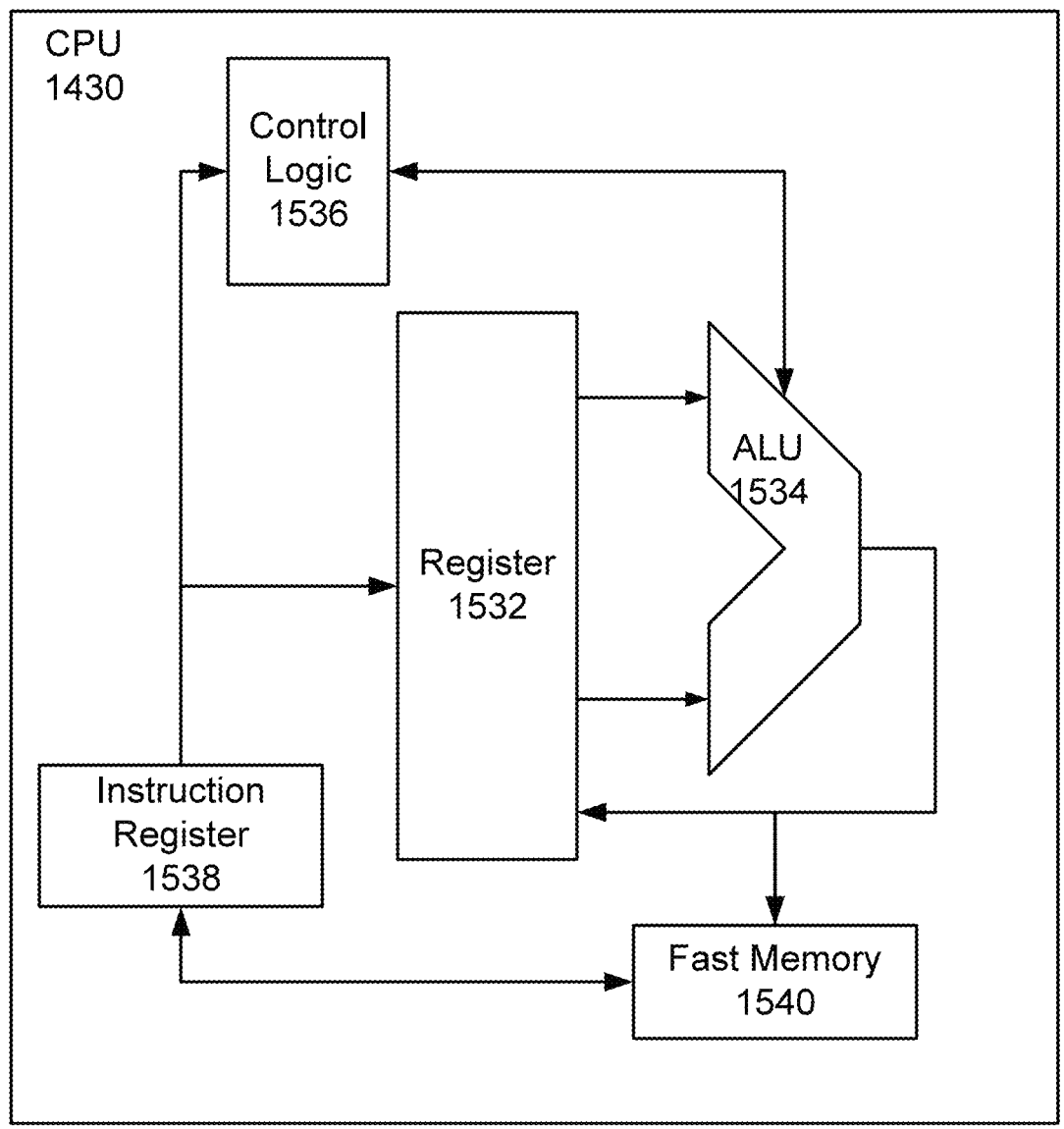

FIG. 15 shows an implementation of a CPU of the computing device, according to certain embodiments.

Figure 16:
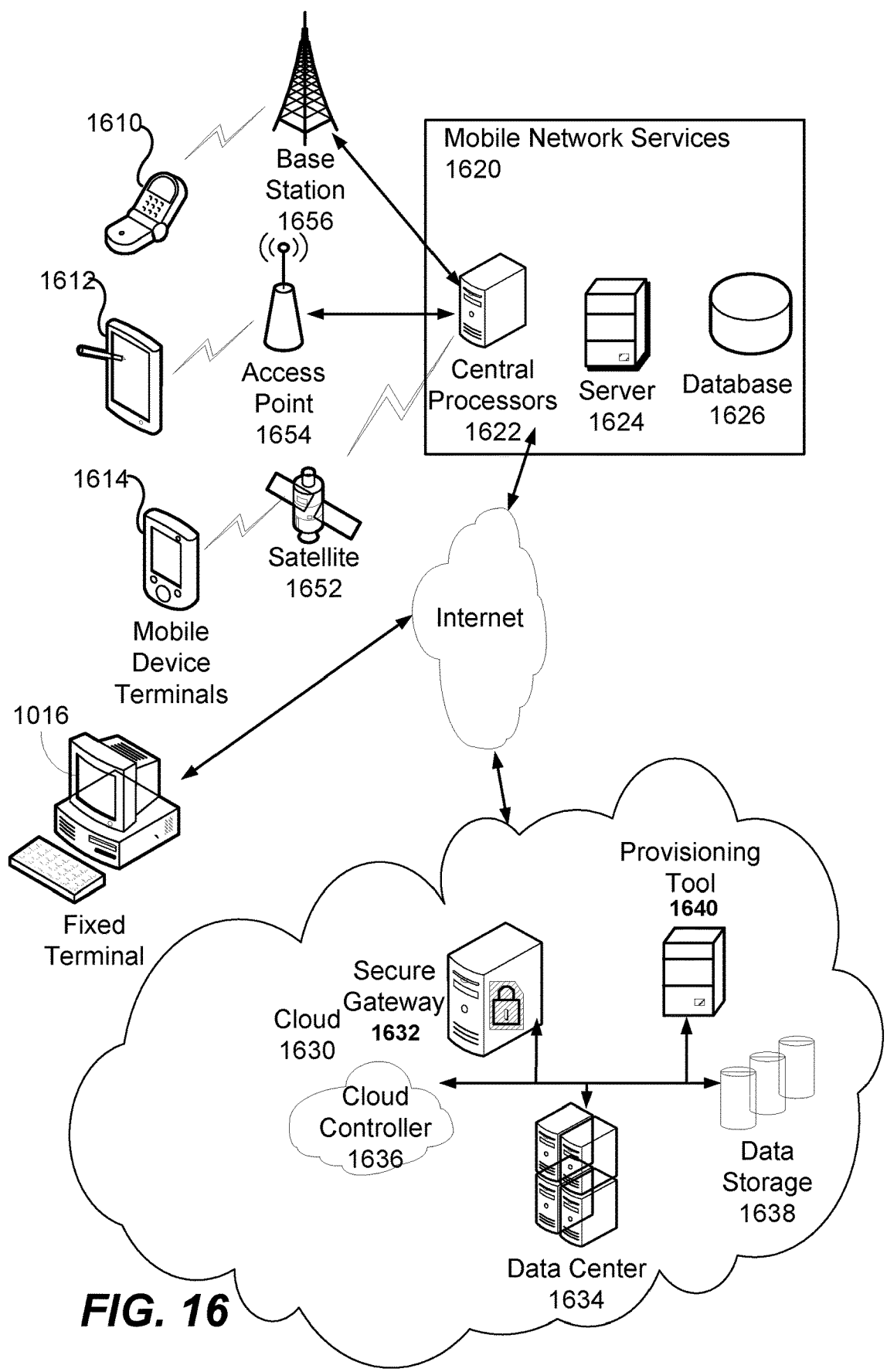

FIG. 16 shows distributed components including one or more client and server machines, which may share processing.

DETAILED DESCRIPTION

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system for seismic surveying including data compression of reflected seismic waveforms received from seismic sensors, a method for performing seismic surveying including data compression of reflected seismic waveforms received from seismic sensors and a non-transitory computer readable medium having instructions stored therein that, when executed by one or more processors, causes the one or more processors to perform a method for performing seismic surveying including data compression of reflected seismic waveforms received from seismic sensors.

In an aspect, a seismic source generates a shot or series of shots which create seismic waves which are promulgated throughout a subsurface. The seismic waves reflect from boundaries within the subsurface and are received by seismic sensors at the surface. Due to the very large volume of seismic waveforms received by the seismic sensors, this data must be compressed before it can be sent to a remote station for further analysis.

The remote station decodes the compressed data and may then perform further analysis of the decoded seismic signals. The seismic signals are analyzed to determine the locations and types of discontinuities in the subsurface, such as layers of rock, sand, oil, water, cavities, etc. The analysis of the decoded signals is not an aspect of the present disclosure, and is well known in the field of seismic processing, no further explanation of the details are necessary for the understanding of the invention.

Aspects of the present disclosure relate to methods of compressing the seismic data. A vector quantizer receives the waveforms as data vectors and pattern matches the vectors to quantization vectors from a codebook. The quantization vectors include amplitudes, angles, and other properties of a codebook data vector. The waveforms (data vectors) are grouped into classes, which are represented as an amplitude and angle. The class represents the set of pattern matched vectors in coded form for data transmission.

In a further aspect, comparison of the data vector with a quantization vector from the codebook includes using a squared error comparison.

The quantization of the present disclosure is a two-step process. First the (functional) class of a data vector is determined. The class is constructed by passing the entire training set of vectors through the functional quantizer which maps the set of training vectors onto a representative set of smooth functions. A data vector is first compared with representative functions to find its class and then, within each class, the minimum squared distortion is used to find the code vector in the codebook.

Functional Vector Quantization

An overview of FQ describing the terminology and definitions from the theory of stochastic analysis, measure spaces and functional analysis needed for a clear understanding of FQ concepts is now presented. The notation used throughout the present disclosure is first presented, followed by the quantization rule for finite dimensional spaces and the quantization rule for infinite dimensional function spaces $L^2([0,T]), T \in \mathbb{R}^+$, where T represents the one way travel time of the seismic wave and $\mathbb{R}^+$ represents the set of non-negative real numbers.

In this approach to seismic data compression, seismic waveforms are modelled as sample paths of a random process, RP. These seismic waveforms (given by RPs) are approximated by a set of deterministic functions and their corresponding probability masses. These deterministic functions are the quantizers of the RP used to model the seismic waveform. The quantizers are constructed such that their probabilistic characteristics are similar to that of the underlying RP.

Quantization, in mathematics and digital signal processing, is the process of mapping input values from a large set (often a continuous set) to output values in a (countable) smaller set, often with a finite number of elements. The difference between an input value and its quantized value (such as round-off error) is referred to as quantization error. Rounding and truncation are typical examples of quantization processes. A device or algorithmic function that performs quantization is called a quantizer. An analog-to-digital converter is an example of a quantizer.

Vector quantization (VQ) allows the modeling of probability density functions by the distribution of prototype vectors. It works by dividing a large set of points (vectors) into groups having approximately the same number of points closest to them. Each group is represented by its centroid point, as in k-means or other clustering algorithms. Vector quantization is often used in lossy data compression. It works by encoding values from a multidimensional vector space into a finite set of values from a discrete subspace of lower dimension. A lower-space vector requires less storage space, so the data is compressed. Due to the density matching property of vector quantization, the compressed data has errors that are inversely proportional to density. The transformation is accomplished by using a codebook. In some cases, a codebook can be also used to entropy code the discrete value in the same step, by generating a prefix coded variable-length encoded value as its output.

The issue of a large source alphabet (usually seismic data has 24-bit depth giving rise to a very large source alphabet) is handled through the use of Automatic Gain Control (AGC) of the amplitude profile of the signal. The AGC profile is then losslessly coded using an arithmetic code and passed as side information to the decoder or recorder unit. The AGC profile, once scaled, has a very low dynamic range, leading to high compression efficiency for an arithmetic coder.

The simplest way to quantize a signal is to choose the digital amplitude value closest to the original analog amplitude. The difference between the original signal and the reconstructed signal is the quantization error and, in a simple quantization scheme, is a deterministic function of the input signal.

The objective of the present disclosure is to compute functional quantizers which are optimal relative to a predetermined distortion criterion for a fixed size of the quantization codebook.

Functional quantization, FQ, is closely connected to Voronoi Tessellations and Centroidal Voronoi Tessellations. In the present disclosure, the connections between the two theories of FQ and Voronoi Tessellations are described. The algorithm that is used to solve the infinite-dimensional functional quantization problem is based on an algorithm which computes the Centroidal Voronoi Tessellation of spaces that have finite Hamel dimensions. (See Q. Du, M. Gunzburger, L. Ju, "Advances in studies and applications of centroidal Voronoi tessellations," *Numer. Math.: Theory, Methods Appl.* 3 (2) (2010) 119142, incorporated herein by reference in its entirety). While the computational cost of obtaining at least a locally optimal quantizer is significant, the use of the FQ algorithm in seismic compression applications is relatively straightforward, with reasonable complexity.

A. Notation and Definitions

The acronyms RP and RV denote random process and random variable respectively. The seismic data is modelled as sample paths of RPs that are bi-measurable, i.e., at a given spatial location in the survey area, the RP is designated by values in the temporal domain $\mathcal{T}$ and in an appropriate probability space related to the sample space $\Omega$. Each trace waveform corresponds to an outcome in the sample space $\Omega$. A RP, X, is assumed to have square-integrable sample paths, finite mean and finite variance and probability density functions that are continuous (i.e., is free of point masses). In the context of seismic data, these are reasonable assumptions as most raw seismic datasets can be modelled with such RPs.

For the analysis that follows, several definitions are introduced. These definitions pertain to the stochastic model upon which the functional quantizer is based. The Hilbert space of a square-integrable function over the time domain $\mathcal{T}$ is denoted by $L^2(\mathcal{T})$, and is referred to as the Lesbesque space. This function space $L^2(\mathcal{T})$ is a separable metric space that is complete and is equipped with the dot product and induced norm $$\langle x,y \rangle L^2(\mathcal{T}) = \int_\mathcal{T} xy\, dt$$

$$\|x\| L^2(\mathcal{T}) = (\int_\mathcal{T} x^2 dt)^{1/2} \quad (1)$$

for any x, y in $L^2(\mathcal{T})$.

$L_2(\Omega)$ is defined as a complete inner product space of random variables, RV, having variance and mean less than infinity. The RVs are given on the measure space $(\Omega, \mathcal{F}, \mathbb{P})$, where $\mathcal{F}$ is the sigma algebra of events in the event space $\Omega$ and $\mathbb{P}$ is the probability measure on the probability space $(\Omega, \mathcal{F}, \mathbb{P})$. Thus the set $\mathcal{F}$ is the collection of "events" to which $\mathbb{P}$ assigns a probability mass. The space includes the dot product and induced norm $$\langle z,y \rangle = \int_\mathcal{T} XY d\mathbb{P} = \mathbb{E}[XY]$$

$$\|x\|_{L^2(\Omega)} = (\int_\Omega X^2 d\mathbb{P})^{1/2} \quad (2)$$

$\mathcal{H} = L^2(\Omega, \mathcal{F}, P; L^2(\mathcal{T}))$ is the space of RPs, X, with sample paths $X(\bullet, \omega) \in L^2(\mathcal{T})$ and RVs $X(t, \bullet) \in L^2(\Omega)$, where $\mathcal{H}$ denotes a Bochner space, which is a special type of Hilbert space, $\mathbb{P}$ denotes the probability, the variable designated by "dot" is the time t in $X(\bullet, \omega)$ with the "sample space point" $\omega$, which is an element of the sample space $\Omega$. $\omega$ used to model the randomness in the source/seismic waveform. In probability theory w is known as a random outcome, an example would be Head or Tail obtained as a result of tossing a fair coin. In the context of seismic data each $\omega$ corresponds to a random realization of a seismic waveform.

In mathematics, Bochner spaces are a generalization of the concept of $L^p$ spaces to functions whose values lie in a Banach space (normed space) which is not necessarily the space R or C of real or complex numbers.

The space $L^p(X)$ consists of all Bochner measurable functions $f$ with values in the Banach space X whose norm $\|f\|_{L^p(x)}$ lies in the bounded Lp space. Thus, if X is the set of complex numbers, it is the standard Lebesgue $L^p$ space.

B. Using Conditional Expectation for Quantization

A rule for obtaining the quantizer codepoint (the point to which a quantization region is mapped) using the basic law of conditional expectation is expressed as an integral of the random process, X with respect to the probability measure $\mathbb{P}$. The basic properties exploited by the quantization rule are given by this law. One of the central properties of this quantizer law is that it results in (at least locally) an optimal quantizer. Finally, this law is reduced to the case of finite dimensions. This quantization law is the basic building block upon which the FQ algorithm is based.

Consider $\{\Omega_i\}_{i=1}^N$ as a refinement of the sample space of $\Omega$ of seismic signals that is measurable. Specifically, assume that (a) $\Omega_i \in \mathcal{F}$ (b) $\Omega = \cup_{i=1}^N \Omega_i$ and (c) $\Omega_i \cap \Omega_j = \emptyset$ for distinct i and j, where the symbol $\in$, denotes "is an element of", $\cup_{i=1}^N \Omega_i$ is the finite union of the sets $\Omega_i$, $\cap$ denotes the intersection of the spaces, and $\emptyset$ denotes the empty set, as is known from set theory. This implies that $\Sigma_{i=1}^N P(\Omega_i)=1$. The sigma algebra generated by $\{\Omega_i\}_{i=1}^N$ is $\mathcal{G}$, i.e., $\mathcal{G}=\sigma(\{\Omega_i\}_{i=1}^N)$. It can be seen that $\mathcal{G}$ is a subset of $\mathcal{F}$ whereby $(\Omega, \mathcal{G}, \mathbb{P})$ is an approximation of $(\Omega, \mathcal{F}, \mathbb{P})$. The accuracy with which $(\Omega, \mathcal{G}, \mathbb{P})$ approximates $(\Omega, \mathcal{F}, \mathbb{P})$ is dependent on both the size of $\mathcal{G}$ and also (for a fixed partition size) on the way in which the original sample space is divided by the partitioning of the space. The coarseness of the partition implies that that the events belonging to $\mathcal{F}$ are poorly approximated by events in the space $\mathcal{G}$ relative to the probability measure $\mathbb{P}$. The reverse is true for partitions that are refined.

Any RP, X, in the Bochner space $\mathcal{H}$ can be readily discretized by means of the refinement $\{\Omega_i\}_{i=1}^N$ and the associated sigma algebra $\mathcal{G}$. The quantizer for the RP, X, can be expressed as $$X_N = \sum_{i=1}^N x_i 1_{\Omega_i} \quad (3)$$

where the $1_{\Omega_i}$ is the set indicator function and $x_i$'s are deterministic functions that represent the RP, X, over each of the sub regions $\Omega_i$ of the sample space. In set theory, a set indicator function is a function defined on a set X that indicates membership of an element in a subset A of X, having the value 1 for all elements of A and the value 0 for all elements of X not in A.

From the above, it can be seen that for a fixed partition $\{\Omega_i\}_{i=1}^N$, the quantization error depends on how the codepoints (the $x_i$'s) are selected. To compute $x_i$'s the following rule is used:

$$x_i = \begin{cases} \dfrac{\int_{\Omega_i} X d\mathbb{P}}{\mathbb{P}(\Omega_i)}, & \text{if } \mathbb{P}(\Omega_i) > 0 \\ \text{undefined}, & \text{otherwise} \end{cases} \quad (4)$$

The definition given above is similar to the traditional concept of conditional expectation. Usually, conditional expectation is used for RVs, rather than for RPs. For the purpose of the present disclosure, RPs are interpreted as RVs which reside in a complete separable metric space. For this interpretation, conditional expectation exists only if the Radon-Nikodym theorem holds in the complete separable space. (See J. L. Doob, *Stochastic Processes*: John Wiley & Sons, 1953, incorporated herein by reference in its entirety). This theorem holds for the Lebesgue space $L^2(\mathcal{T})$ because the it coincides with the continuous dual of its continuous dual space; the above integral, therefore, is well defined in the sense of Bochner.

The properties of the quantized estimate $X_N$ of X in (4) are now described. The first property is the unbiasedness of $X_N$. Each of the functions $x_i$ in (4) have an associated probability $P(\Omega_i)$. The distribution function (CDF) of the quantization $X_N$ is given as $$F_{X_N}(w; t) = \sum_{i=1}^N U(w - x_i(t)) P(\Omega_i) \quad (5)$$

where $U(\bullet)$ is the unit step function. Equation (5) involves time t and therefore, in general, $X_N$ is non-stationary, whether or not X is stationary. Using (5), the mean and autocorrelation of the process $X_N$ can be written as $$\mathbb{E}(X_N(t)) = \sum_{i=1}^N x_i(t) \mathbb{P}(\Omega_i)$$

$$\mathbb{E}(X_N(t) X_N(s)) = \sum_{i=1}^N x_i(t) x_i(s) \mathbb{P}(\Omega_i)$$

using $\mathbb{E}(1_{\Omega_i}) = \mathbb{P}(\Omega_i)$ and $\mathbb{E}(1_{\Omega_i}, 1_{\Omega_j}) = \mathbb{P}(\Omega_i) \delta_{ij}$.

It can now be readily seen that that the RP $X_N$ estimates X in an unbiased fashion:

$$\mathbb{E}(X_N) = \sum_{i=1}^N x_i \mathbb{P}(\Omega_i) = \sum_{i=1}^N \int_{\Omega_i} X d\mathbb{P} = \mathbb{E}(X)$$

Additional properties of the quantized process $X_N$ that are relevant to the present disclosure are as follows. These properties are analogous to the characteristics of conditional expectation for RVs (see J. L. Doob (1953) and M. Grigoriu, *Stochastic Calculus: Applications in Science and Engineering*, Birkhuser, Boston, 2002, (Chapter 2), each incorporated herein by reference in their entirety, for detailed proofs).

1) $X_N$ is strictly non-unique. Two copies of $X_N$ may have different values on events for which $\mathbb{P}(\Omega_i)=0$. This implies that each $X_N$ is unique at most almost surely (a.s.) (in the sense of an equivalence class). This means that the events (i.e., sample paths or traces) that have zero probability of occurring are irrelevant to the process of quantization. In probability theory, an event that happens almost surely (abbreviated as a.s.) if it happens with probability one. The concept is precisely the same as the concept of "almost everywhere" in measure theory.

2) The measurable partition $\{\Omega_i\}_{i=1}^N$ of the sample space and its associated sigma algebra can be taken to be between two opposite extremes. On one hand, the trivial sigma algebra $\mathcal{G}=\{\emptyset,\Omega\}$, where $\emptyset$ denotes the empty set, gives the coarsest possible partition and so $X_N$ is given by the mean of X. Conversely, a fine partition $\mathcal{G}$ of the sample space approximates events in the space $\mathcal{F}$ quite accurately making $X_N$ converge to X almost surely, almost everywhere.

3) Two facts are that a) The RP, $X_N$, is the linear projection of the RP, X, on the Bochner space $\mathcal{H}_\mathcal{G}$ and b) The difference $X_N$–X is orthogonal to any $Y_N$ in $\mathcal{H}_\mathcal{G}$. Thus $X_N$ is an orthogonal projection. As a corollary to the projection theorem for Hilbert spaces, the RP, $X_N$, is the optimal norm approximation of the RP, X, in the subspace $\mathcal{H}_\mathcal{G}$. Therefore, $\|X_N-X\|_\mathcal{H} \le \|Y_N-X\|_\mathcal{H}$ for any $Y_N \in \mathcal{H}_\mathcal{G}$. (See David G. Luenberger, *Optimization by Vector Space Methods*, 1st ed., John Wiley & Sons, Inc. New York, 1997, incorporated herein by reference in its entirety).

Property 3 has particular significance. It shows that for a partition of the sample space of a given size, the quantizer given through conditional expectation is optimal relative to any other possible choice of quantization that is based on the same partition.

The present disclosure considers the following four considerations:

(i) How can a first partition of $\Omega$ be found?

(ii) Assuming that a first partition can be found, for a fixed partition size, are there any other partitions that perform better than the first partition found?

(iii) What optimality criterion should be used for differentiating between partitions?

(iv) Is it possible to obtain an (optimal) partition that results in an optimal quantizer?

The present disclosure shows that functional quantization provides satisfactory answers to these considerations by obtaining a partition of the sample space through a Voronoi Tessellation of $L^2(\mathcal{T})$. Further, a Centroidal Voronoi Tessellation of $L^2(\mathcal{T})$ is used to obtain a partition that determines the best quantizer relative to the norm $\|\cdot\|_\mathcal{H}$ (the norm of a variable as taken over the Bochner space).

C. Voronoi Tessellation and Centroidal Voronoi Tessellation in Finite Dimensions-Vector Quantization Results from traditional vector quantization are now reviewed, as the FQ algorithm is based on these results. The terms Voronoi Tessellation and Centroidal Voronoi Tessellation are defined in this section. The quantization of any RP, X, in the Bochner space $\mathcal{H}$ can be effectively handled using the theory of Voronoi Tessellations (VT) and Centroidal Voronoi Tessellations (CVT). In the past, the VTs and CVTs of Euclidean as well as non-Euclidean spaces in finite dimensions have been exhaustively studied leading to the well-established theory of vector quantization and the k-means clustering algorithm employed in the statistical learning theory literature (See A. Gersho et al. (1992)). See R. M. Gray, D. L. Neuhoff, "Quantization," *IEEE Trans. Inf. Theory* 44 (6) (1998) 23252383; and A. Gersho, R. M. Gray, *Vector Quantization and Signal Compression*, Kluwer, Boston, 1992, each incorporated herein by reference in its entirety). This has been generalized to an infinite dimensional Polish space setting, and introduced the term FQ to quantization literature. (See H. Luschgy, G. Pages, "Functional quantization of a class of Brownian diffusions: a constructive approach," *Stoch. Process. Appl.* 116 (2) (2006) 310336, incorporated herein by reference in its entirety).

The objective of the present disclosure is to use function quantization (FQ) for seismic signal compression. Before discussing Voronoi Tessellation and Centroidal Voronoi Tessellation of the function space $L^2(\mathcal{T})$, a review of Voronoi Tessellation and Centroidal Voronoi Tessellation of $\mathbb{R}^n$ (real number space) is needed to apply the tessellation to finite as well as infinite dimensions. A Voronoi tessellation is called centroidal when the generating point of each Voronoi cell is also its mean (center of mass).

Assume that a finite number of points $\{z_i\}_{i=1}^N$ in $\mathbb{R}^n$ in are given. The Voronoi cell $V_i$ associated with the point $z_i$ is defined as a n-dimensional convex polyhedral region comprising of all points $z \in \mathbb{R}^n$ that are closer to $z_i$ than to any other $z_j$. Thus, $$V_i = \{z \in \mathbb{R}^n : \|z-z_i\| < \|z-z_j\|\} \tag{6}$$

It is clear that each of the $V_i$'s is open in the usual topology (the metric topology induced by $\|\cdot\|_\mathcal{H}$); its frontier is denoted by $\partial V_i$ (the face of a polyhedral region around the codepoint $z_i$) and its closure is $\tilde{V}_i = V_i \cap \partial V_i$. Since $V_i \cap V_j = \emptyset$ for $j \ne i$ and $\mathbb{R}^n = \cup_{i=1}^N \tilde{V}_i$, the collection of Voronoi regions gives a tessellation of $\mathbb{R}^n$. This tessellation is known as a Voronoi Tessellation.

A probability measure $\mu$ with density function $\rho$ is used to assign a probability to each region $V_i$. The centroid of each region $V_i$ is given by $$x_i = \begin{cases} \dfrac{\int_{V_i} x\rho(x)dx}{\mu(V_i)}, & \text{if } \mu(V_i) > 0 \\ \text{undefined}, & \text{otherwise} \end{cases} \tag{7}$$

where $$\mu(V_i) = \int_{V_i} \rho(x)dx$$

Note that it is not necessary for the points $x^*_i$ (the quantizer code point) and $x_i$ (the probability centroid) to coincide. Also take note that measure of the faces of regions, $\mu(\partial V_i)=0$.

A Centroidal Voronoi Tessellation is a specialized version of a Voronoi Tessellation where $x^*_i$ coincides with $x_i$. Equivalently, for a Centroidal Voronoi Tessellation it holds true that the code points $x_i$ that are associated with the Voronoi cells are also the centroids of these Voronoi cells.

Figure 1:
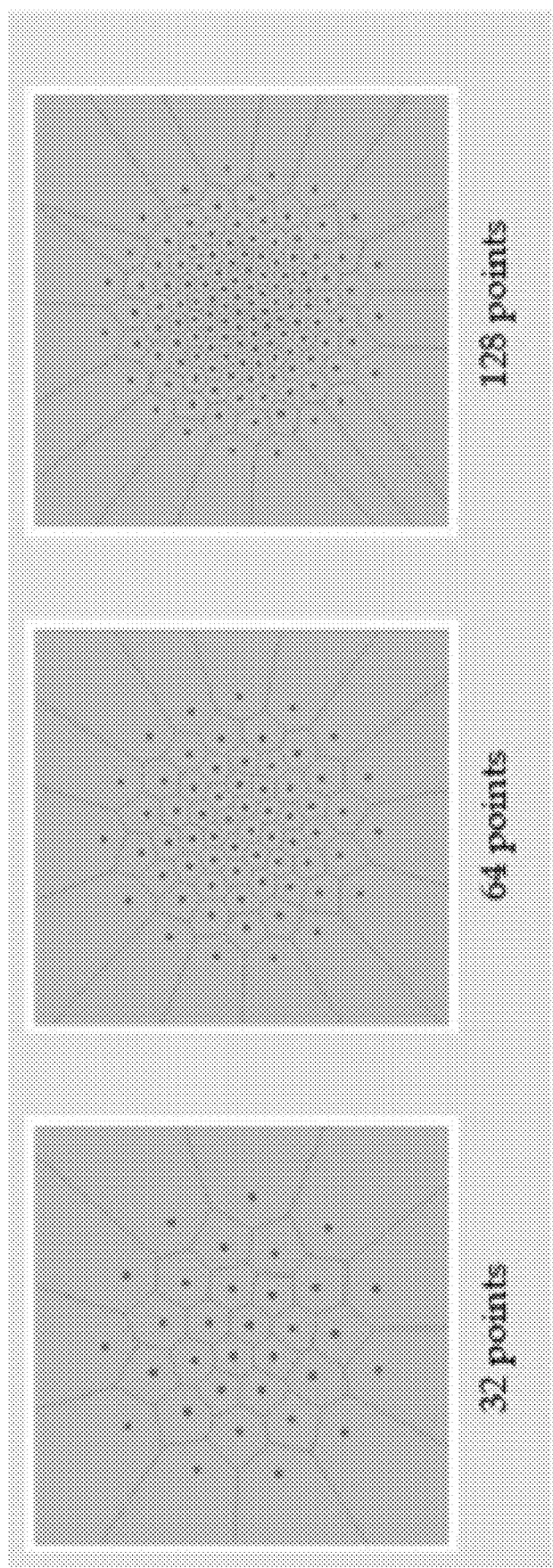
FIG. 1 illustrates Centroidal Voronoi Tessellation of $\mathbb{R}^2$ under a Gaussian probability measure for 32, 64, and 128 point sample sets.

FIG. 1 illustrates a Centroidal Voronoi Tessellation of $\mathbb{R}^2$ under a Gaussian probability measure for 32, 64, and 128 point sample sets. The tessellation induced by the Centroidal Voronoi Tessellation has regions that are more uniform in distribution compared to that of the ones induced by a simple Voronoi Tessellation. This uniformity of shape is intimately connected to the distortion functional:

$$\Delta(\{V_i, x_i\}_{i=1}^N) = \sum_{i=1}^N \int_{V_i} \|x - x_i\|^2 \rho(x)dx \tag{8}$$

where $\{V_i\}_{i=1}^N$ denotes any tessellation of $\mathbb{R}^n$ and $\{x_i\}_{i=1}^N$ denotes any collection of points in $\mathbb{R}^n$. The distortion functional is the objective function to be optimized in the design of the quantizer. For the finite dimensional case the necessary condition for the distortion to be minimized is that the regions $\{V_i\}_{i=1}^{N}$ and points $\{x_i\}_{i=1}^{N}$ make up a Centroidal Voronoi Tessellation.

To summarize, a Centroidal Voronoi Tessellation is constructed by finding a collection of points $\{z_i\}_{i=1}^{N}$ and a collection of regions regions $\{V_i\}_{i=1}^{N}$ such that $V_i$ is the Voronoi cell that corresponds to $z_i$ and $z_i$ is the probability centroid of the Voroni cell $V_i$ simultaneously. It is to be noted that this solution is not unique and the above condition is necessary but not sufficient for optimality. Moreover, the optimum found is in general is local and not global. If the probability measure is log concave, then the solution is found to be global and unique. (See R. M. Gray, D. L. Neuhoff, "Quantization," IEEE Trans. Inf. Theory 44 (6) (1998) 23252383, incorporated herein by reference in its entirety).

Lloyds algorithm (See A. Gersho, R. M. Gray, Vector Quantization and Signal Compression, Kluwer, Boston, 1992, incorporated herein by reference in its entirety) to construct a Centroidal Voronoi Tessellation is one of the most widely used. This method gives a simple four step mechanism for arriving at quantizers that are at least locally optimal:

1) Randomly select a set of points $\{x_i\}_{i=1}^{N}$ in the target signal space to be quantized.

2) Obtain the corresponding Voronoi Tessellation of the points $\{x_i\}_{i=1}^{N}$.

3) Calculate the centroids of this Voronoi Tessellation. Take these centroids to be the new collection of points $\{x_i\}_{i=1}^{N}$.

4) If a convergence criterion is met for these new collection of points (for example the distortion functional becomes less than a threshold), stop the execution of the algorithm; else rerun Step 2.

The probability centroid for a region R is given by:

$$\text{cent}(R) = \underset{y}{\operatorname{argmin}} \mathbb{E}[d(X, y) \mid X \in R] \quad (9)$$

where d is the distortion measure. In the present disclosure, $d(X, Y) = \|X-Y\|_{\mathcal{H}}$. Using the squared error distortion criterion and standard estimation theory, the above relationship becomes equivalent to the conditional mean that was previously defined in equation (5) for general processes:

$$x^*_i = \mathbb{E}[X \mid X \in R] \quad (10)$$

which is the minimum mean squared estimate (MMSE) of X given that $X \in R$.

Computationally, the most expensive part of the algorithm is step 2 above. The cost for constructing a Voronoi Tessellation, which this step entails, is considerable for large codebook sizes and is exponential in the dimension n of the quantizer. This is so because the Voronoi Tessellation construction has a combinatorial complexity of $O(N^{\lceil n/2 \rceil})$, where $O(\cdot)$ is defined by: $f(n)=O(g(n))$ as $n \to \infty$ iff there exists an $M>0$ and an $N>0$ such that $|f(x)| \leq Mg(n)$ for all $n \geq N$. Also, since the algorithm yields a non-unique solution, the final codebook to which it converges depends heavily on the initial collection of starting points—even a slight perturbation can lead to convergence to a different Centroidal Voronoi Tessellation.

D. The Formulation of Voronoi Tessellations and Centroidal Voronoi Tessellations of the Function Space $L^2(\mathcal{T})$ In the preceding discussion, the optimal quantizer in finite dimensions is the one obtained through the construction of a Centroidal Voronoi Tessellation of the space being quantized. This is now applied to the infinite dimensional case of FQ for the space $L^2(\mathcal{T})$. The concepts are similar and the main result is analogous to the case of $\mathbb{R}^n$.

For N functions $\{x_i\}_{i=1}^{N}$ in $L^2(\mathcal{T})$, the Voronoi cell $V_i$ associated with $x_i$ is:

$$V_i = \{x \in L^2(\mathcal{T}) : \|x-x_i\|_{L^2(\mathcal{T})} < \|x-x_j\|_{L^2(\mathcal{T})}\}$$

As in the finite dimensional case, $V_i$ in the functional setting is an open set. The boundary of each region $V_i$ is denoted by $\partial V_i$ and closure of each cell by $\hat{V}_i = V_i \cup \partial V_i$.

The collection $\{V_i\}_{i=1}^{N}$ defines a Voronoi Tessellation of $L^2(\mathcal{T})$ because $V_i \cap V_j = \emptyset$ for $j \neq i$ and $L^2(\mathcal{T}) = \cup_{i=1}^{N} \hat{V}_i$.

A Centroidal Voronoi Tessellation is obtained by first assigning probabilities to each of the Voronoi cells through the use of suitable probability measures. The Voronoi cells are Borel sets. This allows the use of the measure $\mathbb{P}_X$ on $L^2(\mathcal{T})$. Note that since $\mathbb{P}_X$ cannot assign non-zero probability to lumped masses, there is no possibility of assigning positive probability to the boundaries of the Voronoi cells. An answer to the central question raised at the conclusion of subsection B: How to divide (i.e., obtain a partition of) the sample space through a Voronoi Tessellation of $L^2(\mathcal{T})$ can now be found.

The centroid for the probability of each Voronoi cell $V_i$ is given by:

$$x_i^* = \begin{cases} \dfrac{\int_{V_i} x\, d\mathbb{P}_X}{\mathbb{P}_X(V_i)} = \dfrac{\int_{\Omega_i} X\, d\mathbb{P}}{\mathbb{P}(\Omega_i)}, & \text{if } \mathbb{P}(V_i) = \mathbb{P}(\Omega_i) > 0 \\ \text{undefined}, & \text{otherwise} \end{cases} \quad (11)$$

where integration is done in the sense of Bochner. The probability centroid $x^*_i$ are a deterministic function of the regions $V_i$'s and the distribution $\mathbb{P}_X$ and are not generally equal to the codepoints $x_i$ that give rise to the regions $V_i$'s. Also, the definition for $x^*_i$ (for the case of $L^2(\mathcal{T})$) is identical to the previous definition given in (5) for quantizer law through conditional expectation. This implies that one can equivalently determine the probability centroids of the Voronoi Tessellation of $L^2(\mathcal{T})$ in order to determine the conditional expectation of the RP X This observation is key, since this makes possible the connection between conditional expectation and Voronoi Tessellations.

Just as in the finite dimensional case, a Centroidal Voronoi Tessellation is simply a special case of Voronoi Tessellation where the mass centroids $x^*_i$ coincide with $x_i$ for all i. In essence, a Centroidal Voronoi Tessellation is obtained from a set of functions $\{x_i\}_{i=1}^{N}$ $N_i$ and cells $\{V_i\}_{i=1}^{N}$ with the condition that, $V_i$ is the Voronoi cell of the code point $x_i$ and $x_i$ is the probability centroid associated with the Voronoi cell $V_i$.

The overall distortion function for a quantizer for the space $L^2(\mathcal{T})$ that consists of Borel sets (a Borel set is any set in a topological space that can be formed from open sets (or, equivalently, from closed sets) through the operations of countable union, countable intersection, and relative complement) $\{V_i\}_{i=1}^{N}$ and a collection of functions $\{x_i\}_{i=1}^{N}$ in $L^2(\mathcal{T})$, is given by $$\Delta(\{V_i, x_i\}_{i=1}^{N}) = \sum_{i=1}^{N} \int_{V_i} \|x - x_i\|_{L^2(\mathcal{T})}^2 d\mathbb{P}_X \quad (12)$$

where $\{V_i\}_{i=1}^{N}$ denotes any tessellation of $L^2(\mathcal{T})$. It has been proven that there exists an absolute minimizer of the distortion functional. (See S. Graf, H. Luschgy, G. Pages, "Optimal quantizers for Radon random vectors in a Banach space," *J. Approx. Theory* 144 (1) (2007) 2753, incorporated herein by reference in its entirety).

The next theorem demonstrates that the definition of conditional expectation giving rise to a Centroidal Voronoi Tessellation of $L^2(\mathcal{T})$ must necessarily correspond to an optimum quantizer. This is the cornerstone for the FQ algorithm.

Theorem 1: Let a RP, X, be in $\mathcal{H}$. Consider $\{f_i\}_{i=1}^{N}$ as a set of N functions in $L^2(\mathcal{T})$, and $\{V_i\}_{i=1}^{N}$ be a tessellation of $L^2(\mathcal{T})$ into N regions. If $\{\Omega_i\}_{i=1}^{N} = \{X^{-1}(V_i)\}_{i=1}^{N}$ is a refinement of $\Omega$ induced by X and $\{V_i\}_{i=1}^{N}$ then by necessity, the distortion functional $$\Delta(\{V_i, f_i\}_{i=1}^{N}) = \sum_{i=1}^{N} \int_{V_i} \|x - f_i\|_{L^2(\mathcal{T})}^2 d\mathbb{P}_X = \sum_{i=1}^{N} \int_{\Omega_i} \|x - f_i\|_{L^2(\mathcal{T})}^2 d\mathbb{P} \quad (13)$$

should be minimum if each $V_i$ is the Voronoi region associated with each $f_i$ and simultaneously, each $f_i$ is the centroid of the corresponding Voronoi cell $V_i$.

From the above it can be concluded that a Centroidal Voronoi Tessellation minimizes the overall distortion of a quantization. The converse is not true. The non-uniqueness of Centroidal Voronoi Tessellations leads to the fact that different Centroidal Voronoi Tessellations may be associated with different (locally optimal) stationary points of the distortion functional. In the next section, we use Theorem 1 to obtain an efficient algorithm for constructing an FQ for seismic RPs under study.

Algorithm For Computing Locally-Optimal Functional Quantizers

One of the main aspects of the present disclosure is an algorithm to construct a functional quantizer for seismic data compression. From the preceding discussion, it was shown that a Centroidal Voronoi Tessellation of $L^2(\mathcal{T})$ gives a locally-optimal quantizer of a general RP, X, and of seismic waveforms in particular, residing in the Hilbert space $\mathcal{H}$. A description of the FQ construction algorithm is presented, followed by the combination of this FQ technique with other established VQ techniques in the literature.

Monte Carlo methods are employed to arrive at the optimal quantizer. The advantage of using a stochastic version of the previous deterministic algorithm of steps 1-4 for obtaining a Centroidal Voronoi Tessellation is that an explicit construction of Voronoi regions is not required. At any rate, the deterministic algorithm for Centroidal Voronoi Tessellation construction cannot be directly applied to the infinite dimensional space $L^2(\mathcal{T})$, as it works only for finite dimensions and projecting the space to finite dimensions would entail the construction of a Voronoi Tessellation of $\mathbb{R}^n$, which has exponential complexity in the number of dimensions n, resulting in unreasonable computational complexity. Through the use of random sampling, Monte Carlo methods overcome the dimensionality problem encountered in the integration for the probability centroids.

If functions $x^1, x^2, \ldots, x^N$ in $L^2(\mathcal{T})$ are $N_s$ chosen paths of X, then the following relationships are used in the FQ algorithm.

$$\mathbb{P}(\Omega_i) = \int_{\Omega} 1_{\Omega_i} d\mathbb{P} \approx \frac{1}{N_s} \sum_{k=1}^{N_s} 1_{V_i}(x^k) \quad (14)$$

The centroids and distortion are determined as follow:

$$x_i^* = \frac{\int_{\Omega} X 1_{\Omega_i} d\mathbb{P}}{\int_{\Omega} 1_{\Omega_i} d\mathbb{P}} \approx \frac{\sum_{k=1}^{N_s} x^k 1_{V_i}(x^k)}{\sum_{k=1}^{N_s} 1_{V_i}(x^k)} \quad (15)$$

$$\Delta(\{V_i, x_i\}_{i=1}^{N}) = \sum_{j=1}^{N} \int_{\Omega} \|X - x_i\|_{L^2(\mathcal{T})}^2 1_{\Omega_i} d\mathbb{P}_X$$

$$\approx \sum_{i=1}^{N_{sim}} \left( \frac{1}{N_s} \sum_{k=1}^{N_{sim}} \|x^k - x_i\|_{L^2(\mathcal{T})}^2 1_{V_i}(x^k) \right) \quad (16)$$

The FQ algorithm is described thus:

1) Choose integers N and $N_{sim}$, where N is the size of the quantizer and $N_{sim}$ is the number of simulation runs for the Monte Carlo Simulation. Randomly choose a set of functions $\{x_i\}_{i=1}^{N}$ from a database of seismic waveform traces.

2) Select $N_{sim}$ number of training realizations from the training dataset traces. The source of the training set is from historical seismic data gathers previously analyzed by known processing methods.

3) Collect together in the region $V_i$ those realizations of X. Collect in the set $V_i$ (the Voronoi cell i) all sample paths of the RP that are nearer to the code point $x_i$ than to any possible code point $x_j$, according to the norm $\|\bullet\|_{L2(\mathcal{T})}$. If the set $V_i$ so constructed turns out to be empty, stop execution; otherwise, obtain the average of all sample paths in the cell $V_i$ according to (15) and put this average equal to $x_i$. The newly computed points $\{x_i\}$ together with those that are left unchanged form the new set of functions to be used in the next iteration.

4) Continue to repeat step 2 and step 3 until the change in the distortion A given by (16) becomes less than a given threshold.

Hybrid Classified Vector Quantization

Figure 2:
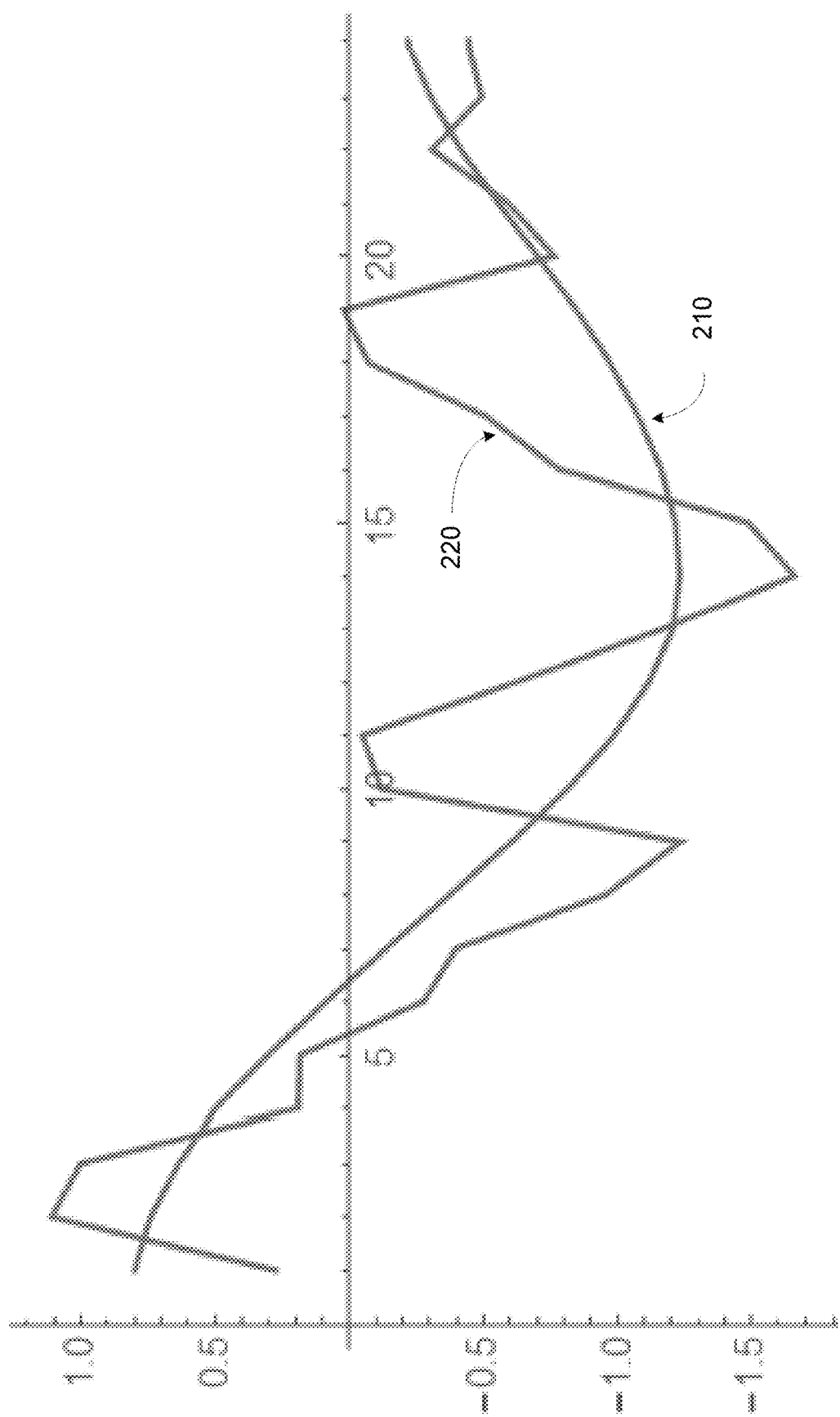
FIG. 2 is a graph depicting the comparison of a Seismic Waveform (with sensor noise included) to the functional quantized codepoint.

The FQ algorithm presented above is efficient but presents a problem when it comes to quantizing seismic waveform traces. The problem with FQ applied to seismic traces is that the fine structure of the waveform is lost as can be seen in FIG. 2, where a quantized function 210 is overlaid with the original seismic trace 220. This is because the FQ waveforms in the algorithm are obtained through averaging which smooths them out. This is problematic for the processing and interpretation stages that follow acquisition.

In general, a vector quantizer, VQ, groups input samples in vectors and represents each input vector by means of a template vector (or code vector) chosen from a finite collection called a codebook. Let x be a generic input vector and let $\hat{X}$ be equivalent to $\{\hat{x}_1, \hat{x}_2, \ldots, \hat{x}_N\}$ be the codebook, then VQ performs the mapping Q: $x \rightarrow \hat{x}_m$, where $\hat{x}_m$ minimizes a suitable distortion measure $d(\bullet,\bullet)$ usually the squared error, over the whole codebook:

$$d(x,\hat{x}_m) \leq d(x,\hat{x}_n), n=1,2,\ldots,N.$$

Figure 3A:
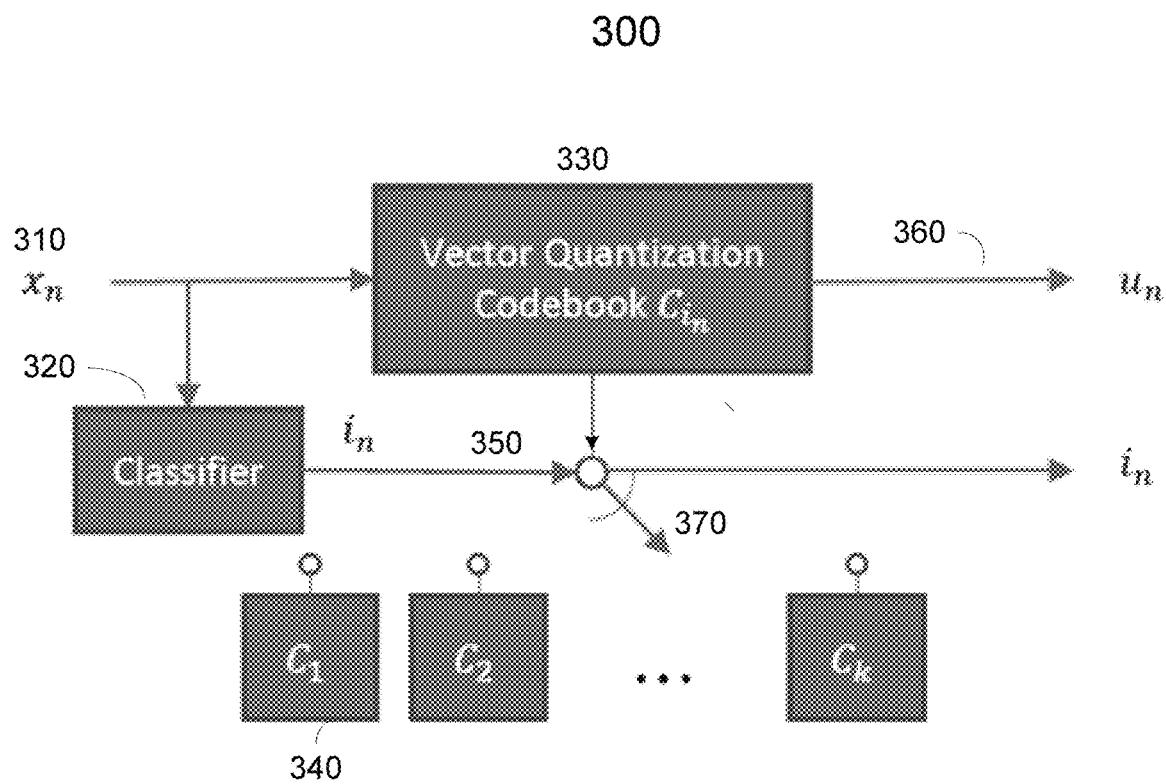
FIG. 3A illustrates the classic CVQ concept.

A solution to the FQ smoothing problem is found by using Classified Vector Quantization (CVQ). CVQ is analogous to using a single stage vector quantizer with a tree-structure, where the objective function for selection of the branch to traverse depends on a particular characteristic of the vector to be quantized. In place of a particular codebook, a carefully designed classifier selects one among many codebooks to search. In the present disclosure, the traces $x_n$ 310 are used in the classifier 320. FIG. 3A illustrates the concept of receiving the traces $x_n$ (310), classifying the traces in Classifier 320 to produce $i_n$ classified vectors, searching for the index $i_n$ of the class of each vector $x_n$ among the class codebooks $C_1, C_2, \ldots, C_k$ (selecting among the codebooks $C_1, C_2, \ldots, C_k$, where each codebook $C_k$ belongs to class k). In addition to the class index, $i_n$, $\log_2 \|C_{i_n}\|$ bits are transmitted as $u_n$ which gives the index of the code vector in the class codebook $C_{i_n}$.

The classical CVQ architecture is extended by using FQ in conjunction with CVQ (hybrid FQ-CVQ). The basic idea behind the hybrid FQ-CVQ is to use the FQ code points as codebooks 340. A class represents a sub codebook for quantization. Within each class there is again requantization (which becomes more accurate as each class is restricted to a particular shape of the seismic waveform). The final quantization step is a shape-gain VQ using regular finite dimensional quantization. The architecture of this hybrid FQ-CVQ is now restricted or constrained.

In gain shape VQ (GSVQ), the norm (gain) of the input vector is first extracted and scalar quantized using a codebook of gains while the unit-norm shape vector is quantized separately using a codebook of shapes. The input vector is then represented as the product of optimal gain and shape. (See Canta, G. Paura, L, Poggi, G., "Generalized gain-shape vector quantization for multispectral image coding", (1996) https://www.eurasip.org/Proceedings/Eusipco/1996/paper/pic_14.pdf, incorporated herein by reference in its entirety)

As mentioned above, an AGC block is used to cover the wide dynamic range of the seismic trace waveform. An AGC and arithmetic code AGC profile is produced and sent as side information to the decoder which multiplies the samples of the decoded waveform from the FQ-CVQ with the arithmetic decoded AGC gain values to recover the original signal.

A. Design of the FQ-CVQ

The procedure for designing the CVQ based on the classes generated by the FQ is now described. Once design of the FQ is completed, the sub-codebooks are designed in the following way. For a training set T, an n number of subsets $T_i$ are generated, by applying the training set T to the classifier. Then the $T_i$ subsets of the training set are used to construct a sub-codebook with $n_i$ entries. The CVQ codebook is the union of each sub-codebook. Bit allocation is then performed for each of the classes. This is an optimization problem which yields a variable rate VQ. However, the objective function for this optimization problem is not known in closed form, as the distortion accumulated as a function of the number of bits allocated to each class is not computable in a simple way, so a heuristic numerical technique (the BFOS algorithm)) is used. (See E. A. Riskin, "Optimal bit allocation via the generalized BFOS algorithm," in *IEEE Transactions on Information Theory*, vol. 37, no. 2, pp. 400-402, March 1991, incorporated herein by reference in its entirety).

Residual or Multistage Vector Quantization

Figure 3B:
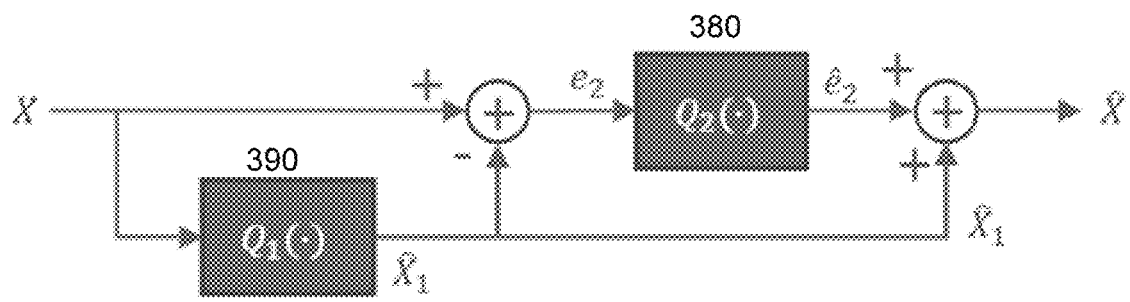
FIG. 3B illustrates a two stage VQ Encoder, according to certain embodiments.

In addition to CVQ, the plain FQ can be enhanced by residual or multistage vector quantization. The structure of a FQ-residual VQ is now described. The residual VQ encoding process is divided into multiple stages. The initial stages carry out a coarse quantization employing a codebook of relatively small size. Subsequent stages perform fine grain quantization. Quantization is performed on the residual difference between the original signal to be quantized and the quantized signal at the output of the initial stages, as shown by FIG. 3B. The quantized residual then offers a fine-grained quantization of the original signal resulting in a more precise approximation. The residual VQ technique may be comprised of two or more stages, in which each successive stage refines the quantization. This method is particularly useful for the gain normalized seismic traces generated by the AGC algorithm of the present disclosure as the input does not have a wide variation in gain and is substantially zero-mean. This low gain variation is particularly suitable for residual VQ.

Figure 4:
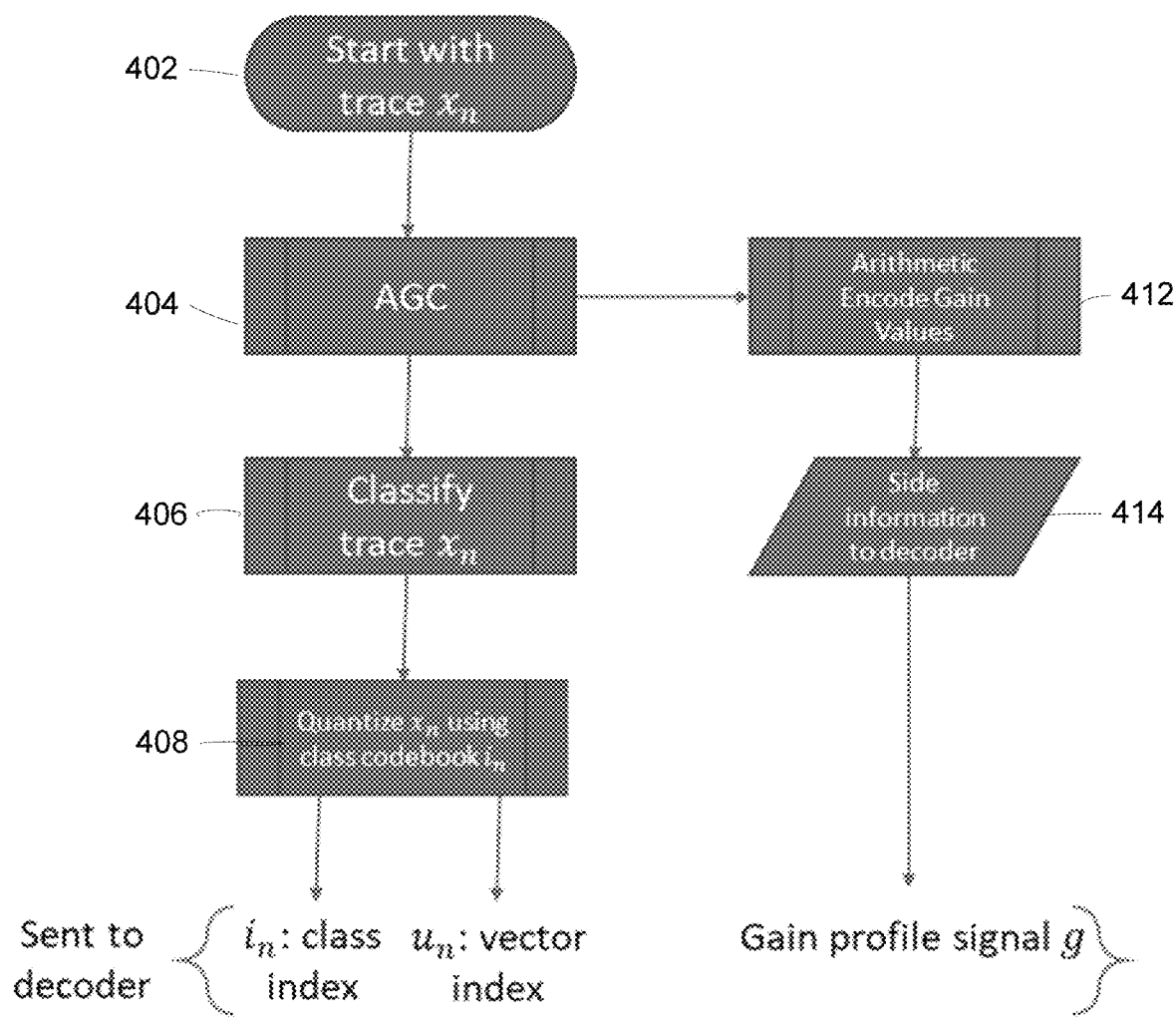
FIG. 4 is a flowchart illustrating the compression steps, according to certain embodiments.

In the present disclosure, modification of the standard residual/cascaded/multi-stage quantizer is thus: For the first stage of the cascaded VQ, a coarse functional quantizer $Q_1$ (390) is used producing quantized traces $\hat{X}_1$, and for the second stage, a fine functional $Q_2$ (380) quantizer is used as shown in FIG. 3B. In FIG. 3B, $e_2$ is the difference (the error) between the original trace X and its quantized version $\hat{X}_1$, while $\hat{e}_2$ is further quantization of the error signal $e_2$ itself. The coarsely quantized signal $\hat{X}_1$ is added to the error correction $\hat{e}_2$ to produce the signal $\hat{X}_1$ which more closely represents the original trace 220 when decoded. Superior distortion performance is obtained while using an AGC 404 as shown in FIG. 4.

Both the FQ blocks, $Q_1$ and $Q_2$ are designed using the algorithm described above.

Recursive Quantizer Structures

Memoryless vector quantizers have been considered up to this point. This constraint is now removed and quantization structures with memory are utilized. In memoryless quantizers, the codebook or the quantization function remains constant from vector to vector. The alternative approach is to use quantizer that has memory, which provides source coding with memory (e.g. channel modulation with memory, e.g., trellis coded modulation). In this situation, the quantizer changes from vector to vector, i.e., the quantization index that will be assigned to the current vector depends on the past encoded vectors. The quantizer effectively has a state, which changes as the input is processed. The output of the quantizer recursively depends on its past output and states. This type of quantizer is also referred to as a recursive quantizer. A memoryless VQ is a special case of a recursive quantizer with just one state.

The performance bounds for memoryless and recursive quantization are the same: any point on the rate-distortion curve achievable by a recursive quantizer is also achievable by some memoryless quantizer. However, these results are asymptotic, in that they hold true if the vectors of arbitrary large dimensions are allowed. A recursive VQ is more attractive than conventional memoryless VQ, as a recursive VQ offers the same rate/distortion performance pair as a memoryless vector quantizer with considerably less block length by exploiting a large number of small-sized codebooks that collectively offer a huge collection of codewords. The computational complexity is also within practical limits (provided that the state transition function is designed well and works well for the given source). Also, if the source has memory, the gains offered by recursive VQ are multiplied two-fold. This is due to the fact that, assuming a source that moves from state to state according to a probability law, a recursive VQ can be designed so that its state transition matches that of the source, enabling it to exploit the correlation between the symbols/waveform samples emitted from the source.

Aspects of the present disclosure describe a recursive VQ technique for a seismic source to exploit its memory. The traditional recursive VQ concept is improved by using FQ codebooks in place of regular codebooks. This results in further reduction of computational complexity both the in the design of the quantizer and in the task of quantization. This reduced complexity affords the achievability of higher rate-distortion points on the rate-distortion tradeoff for lossy compression than would be possible by using either FQ or recursive VQ in a standalone fashion.

A. Design of Encoder/Decoder for FQ-Recursive Quantizer

The basic strategy used to design the FQ-Recursive Quantizer is to aim for good quantizers instead of strictly optimal ones for which no general procedure is known. In contrast to the case for the memory-less quantizer, locally optimal recursive quantizers may not exist. Thus, ones which perform well in practical scenarios through simulations are used. As a rule, the objective function for optimization is for recursive quantization, not the overall distortion for the encoder. As in memoryless VQ design, an iterative search through the design space is performed by modifying only one block of the quantizer while keeping the other blocks fixed. The design process involves three different steps: 1) Design of the initial classifier block (this is the FQ quantizer of the present disclosure) 2) Design of the state-space, the next state function and the state codebook and finally 3) Iterative design of the VQ codebook.

The classification block is meant to group the seismic waveforms into classes or states. In the seismic signal setting, this is the FQ block that maps the input waveform to functions in the function space $L^2(\mathcal{T})$. The recursive quantizer tracks this state as the state evolves. The subparts of the second steps are obtained as a byproduct of the classifier design in step 1. In the last step, the codebook is improved by using the iterative method of Lloyd-Max as used in the design of the memoryless VQ. Although this approach is not founded on theoretical results regarding optimality and is heuristic, it yields good quantizers in practice as shown by the results of the present disclosure. These results show that the best recursive quantizer has been obtained using slight modifications of the design procedure given above.

To summarize as shown in FIG. 3A, 3B, the seismic traces X are quantized in a coarse quantizer $Q_1$ (390) to produce quantized traces $\hat{X}_1$. The quantized traces are subtracted from the original traces and the residual $e_2$ is applied to the fine quantizer $Q_2$. The output of $Q_2$ is the quantized residual $\hat{e}_2$, which is then added to the coarsely quantized trace $\hat{X}_1$ to form the quantized trace $\hat{X}$.

A flowchart of the procedure is shown in FIG. 4. The seismic signals are applied to AGC 404. The AGC produces a gain normalized version of the original trace information by removing highly varying traces. Output from the AGC is then applied to the classifier 406. AGC 404 further generates arithmetic encoded gain values 412, which are transmitted as side information 414 to a decoder. The classifier codebook 330 of FIG. 3A is replaced by functional quantizer codebooks developed from the training set. The output from the functional quantization is the vector index $u_n$ which is $\log_2 \|C_{i_n}\|$ bits in length, and the output from the classifier is $i_n$, the class index for each trace $x_n$. The compressed data, $u_n$ and $i_n$, are representative of the original seismic traces $x_n$. The vector index $u_n$ and the class index $i_n$ are then transmitted to a decoder at a remote station (not shown) for reconstruction of the seismic traces. The decoder also receives the gain profile signal g to decode the $u_n$ and $i_n$ to retrieve each trace n.

Figure 5A:
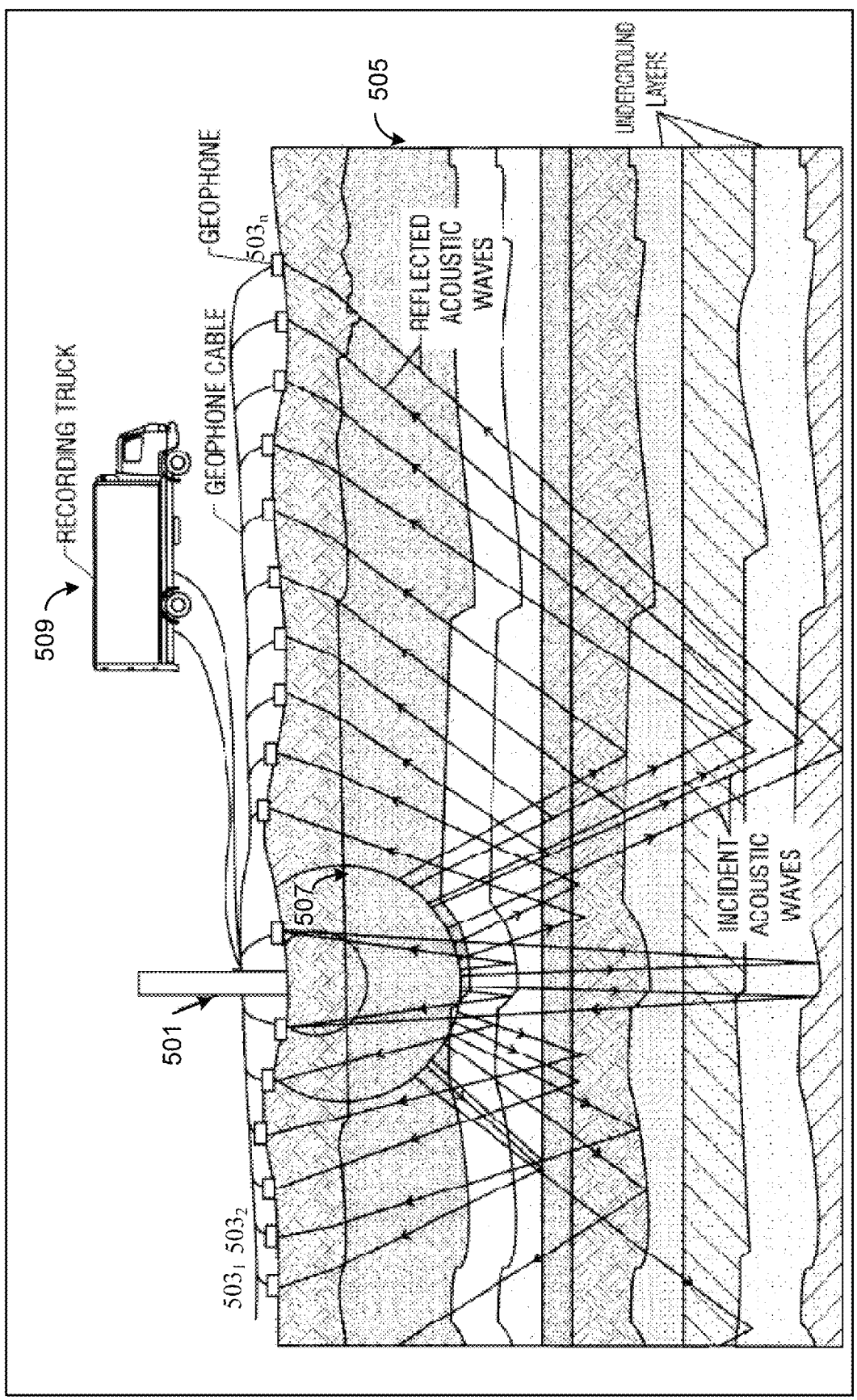
FIG. 5A illustrates a seismic acquisition environment, according to certain embodiments.

FIG. 5A illustrates the acquisition of seismic signals. In FIG. 5A, a seismic shot source 501 generates an acoustic wavefront 507 into an underground formation 505. The waves are reflected from discontinuities in the subterranean formation. These reflected waves are acquired by a plurality of geophones $503_1, 503_2, \ldots, 503_n$. The signals acquired at geophones 503 are transmitted to a recorder 509 which gathers the signals into traces representing signal acquisition during set time periods. FIG. 5A shows the signals from the geophones being transmitted by wired connection to a recorder 509 in a recording truck, however the signals may be transmitted wirelessly. After compression, which will be detailed below, the compressed signals are transmitted wirelessly to a decoder at a remote station.

Figure 5B:
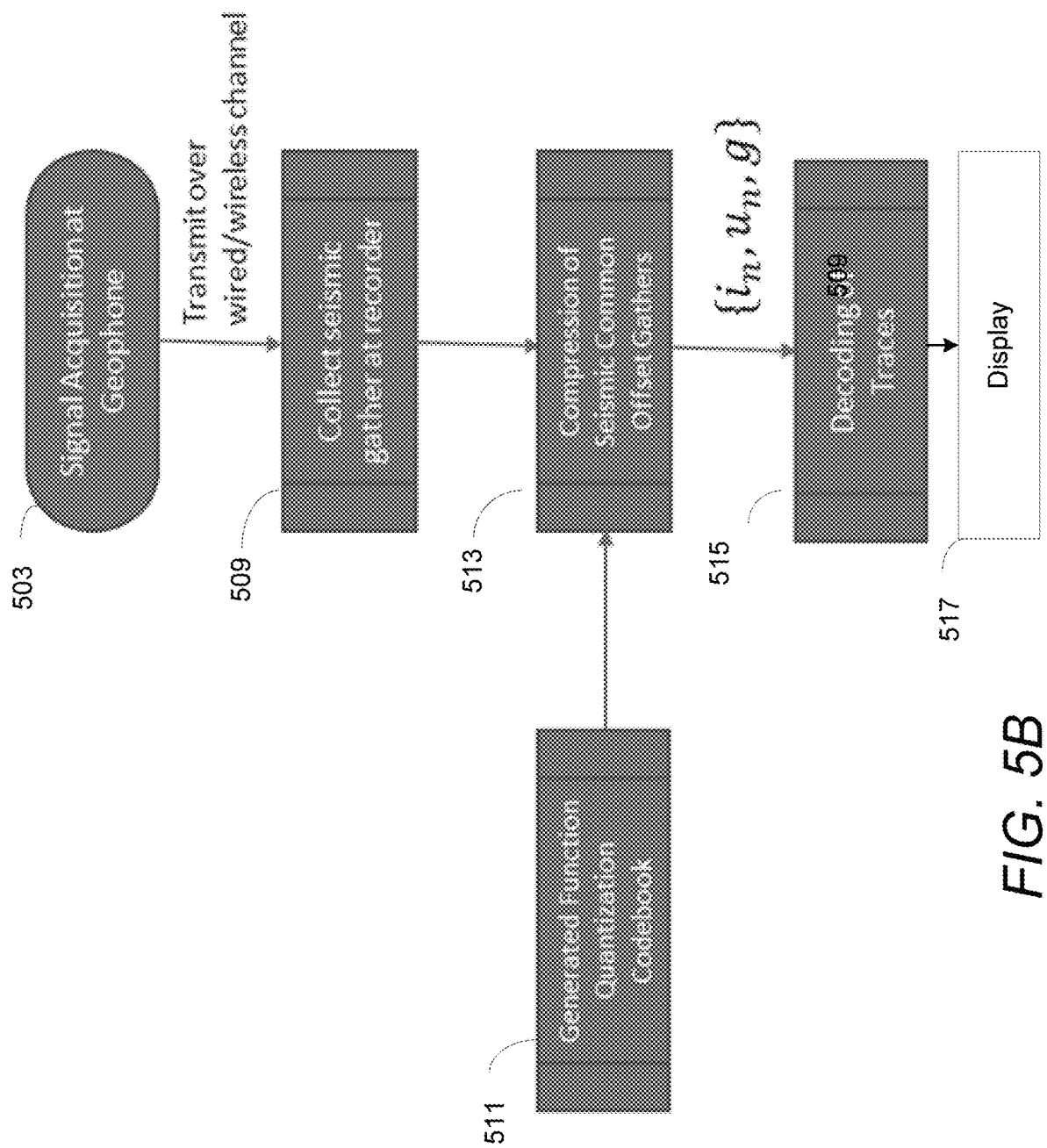
FIG. 5B illustrates a block diagram of seismic acquisition, compression and decoding, according to certain embodiments.

As shown in FIG. 5B, the signals acquired at the geophones 503 are collected at the recorder 509. The functional quantization codebook 511 as shown in FIGS. 3A and 3B, is accessed to compress the seismic gathers at 513 to generate the classifier index $i_n$ and the vector index $u_n$. The indices $u_n$, $i_n$ are the compressed data which is sent to decoder 515, along with the gain profile signals g. After decoding, the decoded data may then be processed for display at 517 and undergo further analysis as needed (not shown) to determine the locations and types of discontinuities in the subsurface, such as layers of rock, sand, oil, water, cavities, etc.

Figure 6:
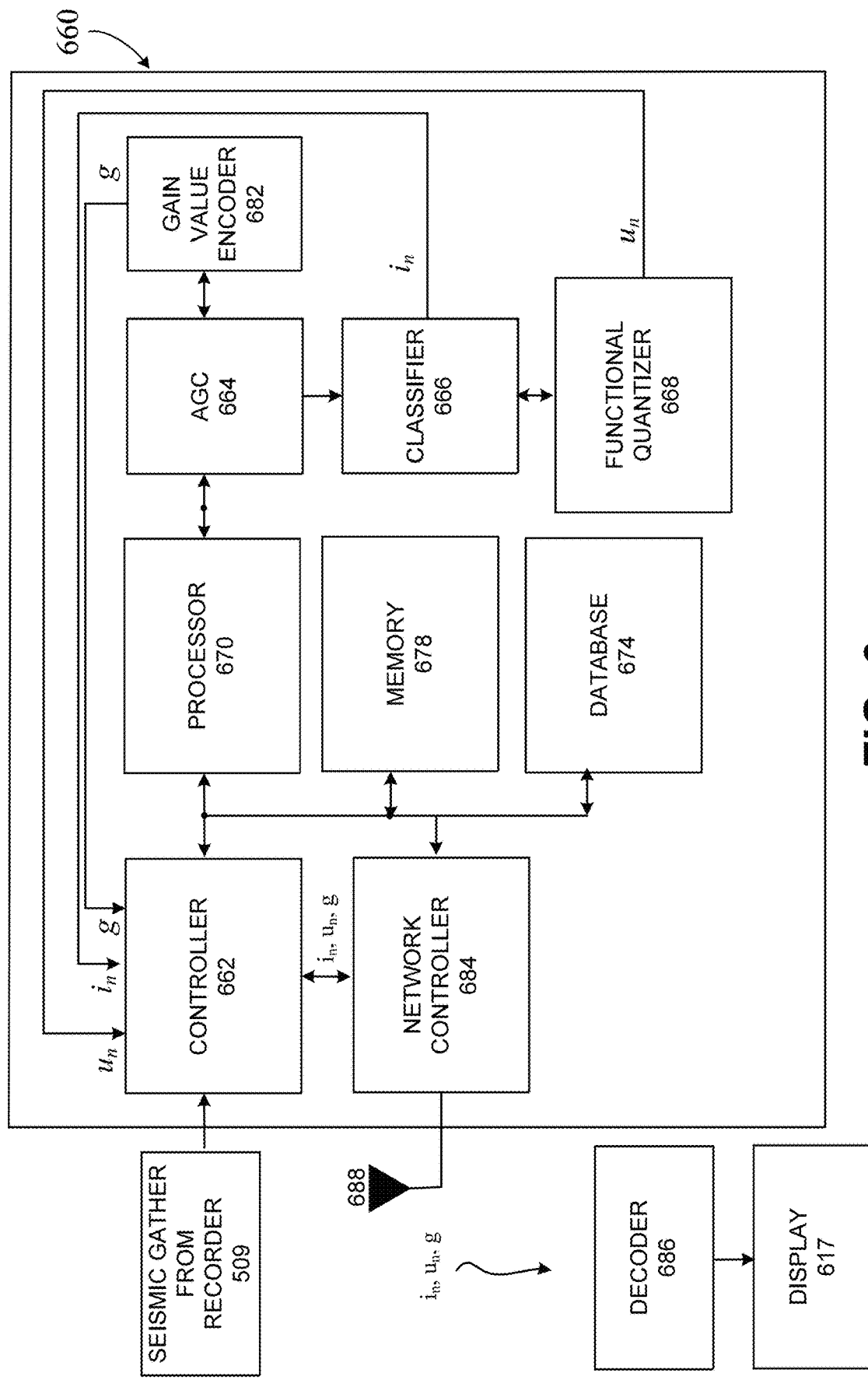
FIG. 6 illustrates a control system used to compress the seismic data, according to certain embodiments.

FIG. 6 illustrates a control system 660 which performs the acquisition, compression and transmission of the seismic gathers. A decoder 686 having a display 617 is shown. The decoding is generally done at a location remote from the control system at a control station (not shown). The control system includes at least a controller 662, a processor 670, a memory 678, a database 674, a network controller 684, an AGC 664, a classifier 666, a functional quantizer 668 and a gain value encoder 682.

The seismic gather from recorder 509 is transmitted to the controller 662, by wired or wireless transmission. The controller 662 is connected to the processor 670, which sends the seismic gather to the AGC 684. The gain values from the AGC are encoded in gain value encoder 682 and are sent back to the controller to be transmitted as side information by the network controller 684. The encoded gain values g are transmitted from the antenna 688 to the decoder 686.

The processor 670 accesses program instructions from memory 678 and may access control settings, system parameters or other information as needed to perform the functions of the processing from the database 674. The AGC smooths the seismic gather data by attenuating high amplitude signals and then transmits the seismic signals to the classifier 666.

The classifier 666 generates the class index $i_n$, which is matched to a functional quantization subcodebook in the functional quantizer 668. The output of the functional quantizer is the $u_n$, the $\log_2 \|C_{i_n}\|$ bits in length, which gives the index of the code vector in the class codebook $C_{i_n}$.

The indices $u_n$ and $i_n$ are then fed back to the controller 662, which sends the indices to the network controller 684 for transmission to the remote station. The remote station receives the gain values and the indices and decodes the compressed signals. Processing circuitry at a remote control station reconstructs the decoded signals and displays 617 or otherwise performs further analysis of the seismic data to determine characteristics of the subterranean formation 505.

The first embodiment is shown with respect to FIGS. 3A, 3B, 4, 5A, 5B, 6.

The first embodiment describes a system for data compression of reflected seismic waveforms received from seismic sensors 503. The system comprises at least one seismic generator 501 for emitting seismic waves 507 into a geological formation 505; a plurality of seismic receivers 503, wherein each seismic receiver receives seismic waveforms reflected from discontinuities 508 in the geologic formation.

A recorder 509 is connected to the plurality of seismic receivers. The recorder 509 collects the seismic waveforms from each seismic receiver 503 and generates n seismic traces $x_n$, where n=1, 2, ..., n.

The system includes a control system 660 including a controller 662 connected to the recorder 509, a memory 678 connected to the controller and including program instructions for compressing the seismic traces; a processor 670 connected to the controller, wherein the processor is further connected to the memory to access the program instructions.

An automatic gain controller 664 (AGC) connected to the processor; a classifier 666 is connected to the AGC; a gain value encoder 682 is connected to the AGC; a functional quantizer 668 is connected to the classifier.

In a non-limiting example, the AGC may be the AN1016 manufactured by Renesas Electronics America Inc., 1001 Murphy Ranch Road, Milpitas, Calif. 95035 https://www.renesas.com/us/en/www/doc/application-note/an1016.pdf In order to transmit the compressed seismic traces to a remote processing station, a network controller 684 is connected to the controller, and an antenna 688 is connected to the network controller.

The controller has circuitry configured to receive each seismic trace $x_n$ and instruct the processor to compress each seismic trace. The processor compresses each seismic trace by applying each seismic trace to the AGC, the classifier and the functional quantizer to generate, for each seismic trace, a class index, and a quantization vector index.

Further, the AGC transmits each gain value to the gain value encoder which generates an encoded gain value, g. The gain value, class index and quantization vector index are sent to the controller, which transmits each encoded gain value, g, class index $i_n$, and quantization vector index $u_n$ to the network controller. The network controller causes the antenna to transmit each encoded gain value g, class index $i_n$, and quantization vector index $u_n$ of the compressed trace to a decoder for reconstruction of each reflected seismic waveform.

In order for the processor to perform the compression by the processor, the AGC generates a gain normalized seismic trace $x_{n_g}$ from the seismic traces. The classifier receives the gain normalized traces and generates the class index, $i_n$. The functional quantizer includes a vector quantizer having class codebooks, and the vector quantizer utilizes the class codebook associated with the class index $i_n$ to quantize the trace $x_{n_g}$ and generate the quantization vector index $u_n$.

In the system of the first embodiment, the functional quantizer is a hybrid functional quantizer including a coarse functional quantizer $Q_1$ and a fine residual functional quantizer $Q_2$ to perform error correction. The coarse functional quantizer generates a quantized seismic trace x̂n and computes the residual of the difference between the seismic trace $x_n$ and the quantized seismic trace x̂n; applies the residual to the residual fine functional quantizer to generate a quantized residual $ê_2$. The quantized residual $ê_2$ is summed with the quantized seismic trace ên to error correct the quantization vector index $u_n$ for each $x_n$.

The functional quantizer is one of a recursive functional quantizer, a classified functional quantizer and a multistage functional quantizer.

In order to build the functional quantizer to quantize seismic traces, the class codebooks of the vector quantizer are generated by applying a known set of training seismic traces $x_t$ to the equation $$\mathbb{P}(\Omega_i) = \int_\Omega 1_{\Omega_i} d\mathbb{P} \approx \frac{1}{N_s} \sum_{k=1}^{N_s} 1_{V_i}(x^k)$$

where $\mathbb{P}(\Omega_i)$ is the probability measure of the sample space $\Omega_i$, $N_s$ equals the number of traces, i=1, 2, ..., N, $1_{\Omega_i}$, $1_{V_i}$ are the unity matrix for the sample space $\Omega_i$ and the voronoi cell $v_i$, and determining the centroids, $x^*_i$, and distortion, $\Delta(\{V_i, x_i\}_{i=1}^N)$ $$x_i^x = \frac{\int_\Omega X 1_{\Omega_i} d\mathbb{P}}{\int_\Omega 1_{\Omega_i} d\mathbb{P}} \approx \frac{\sum_{k=1}^{N_s} x^k 1_{V_i}(x^k)}{\sum_{k=1}^{N_s} 1_{V_i}(x^k)}$$

$$\Delta(\{V_i, x_i\}_{i=1}^N) = \sum_{j=1}^N \int_\Omega \|X - x_i\|_{L^2(T)}^2 1_{\Omega_i} d\mathbb{P}_X$$

$$\approx \sum_{i=1}^{N_{sim}} \left( \frac{1}{N_s} \sum_{k=1}^{N_{sim}} \|x^k - x_i\|_{L^2(T)}^2 1_{V_i}(x^k) \right)$$

then generating a set of codebooks, one for each class. Each class has a representative functional profile which is used for matching a seismic signal to its codebook. The classifier than performs a nearest neighbor search on each of the classes and then within each class codebook the nearest vector to the seismic trace is selected. The index $u_n$ of the nearest vector is transmitted with the class index $i_n$.

The seismic generator is at least one of a shot source, a vibrator on a vibrator truck, an explosive device, a water gun, an air gun, and a vapor gun, and the seismic receiver is at least one of a geophone, a seismometer, a microphone, a particle velocity sensor, a water pressure sensor, a particle displacement sensor, a particle acceleration sensor and a pressure gradient sensor.

The second embodiment is illustrated by FIGS. 3A, 3B, 4, 5, 6. The second embodiment is drawn to a method for data compression of reflected seismic waveforms received from seismic sensors 503, comprising generating, by a seismic generator 501, at least one seismic wave 507 into a geological formation 505 and receiving, a plurality of seismic receivers 503, seismic waveforms reflected from discontinuities 508 in the geologic formation; collecting, by a recorder 509 connected to the seismic receivers, the seismic waveforms and generating n seismic traces $x_n$, where n= 1, 2, . . . , n.

The second embodiment further comprises receiving, by a controller 662 connected to the recorder 509, the seismic traces; compressing, by a processor 670 connected to the controller, the seismic traces, wherein the processor compresses each seismic trace by applying each seismic trace to an automatic gain controller, AGC 664, a classifier 666 and a functional quantizer 668 and generating, for each seismic trace, a class index $i_n$, and a quantization vector index $u_n$.

The method further comprises generating, by the AGC, a gain value for each trace and encoding, by a gain value encoder 682 connected to the AGC, an encoded gain value, g, for each trace.

The method proceeds by transmitting, by the controller, each encoded gain value, g, class index $i_n$, and quantization vector index $u_n$ to a network controller 684; and transmitting, with an antenna 688 connected to the network controller, each encoded gain value g, class index $i_n$, and quantization vector index $u_n$ of the compressed trace to a decoder 686 for reconstruction of each reflected seismic waveform.

Compressing by the processor further includes generating, by the AGC, a gain normalized trace $x_{n_g}$ for each seismic trace $x_n$; receiving, by the classifier, each gain normalized trace and generating a class index $i_n$ for each gain normalized trace; receiving, by a functional quantizer connected to the classifier, each gain normalized trace $x_{n_g}$ and each class index $i_n$; quantizing, by the functional quantizer, each gain normalized trace by applying the gain normalized trace to a vector quantizer having class codebooks $C_1, C_2, \ldots, C_n$ 340, wherein the vector quantizer utilizes the class codebook associated with the class index $i_n$ to quantize the trace $x_{n_g}$ and generate the quantization vector index $u_n$.

The method further includes generating the class codebooks 340 of the vector quantizer by applying a known set of training seismic traces $x_t$ to the equation $$\mathbb{P}(\Omega_i) = \int_\Omega 1_{\Omega_i} d\mathbb{P} \approx \frac{1}{N_s} \sum_{k=1}^{N_s} 1_{V_i}(x^k)$$

where $\mathbb{P}(\Omega_i)$ is the probability measure of the sample space $\Omega_i$, $N_s$ equals the number of traces, i=1, 2, . . . , N, $1_{\Omega_i}$, $1_{v_j}$ are the unity matrix for the sample space $\Omega_i$ and the voronoi cell $v_i$,
and determining the centroids, $x^*_i$, and distortion, $\Delta(\{V_i, x_i\}_{i=1}^N)$ $$x_i^* = \frac{\int_\Omega X 1_{\Omega_i} d\mathbb{P}}{\int_\Omega 1_{\Omega_i} d\mathbb{P}} \approx \frac{\sum_{k=1}^{N_s} x^k 1_{V_i}(x^k)}{\sum_{k=1}^{N_s} 1_{V_i}(x^k)}$$

$$\Delta(\{V_i, x_i\}_{i=1}^N) = \sum_{j=1}^N \int_\Omega \|X - x_i\|_{L^2_T}^2 1_{\Omega_i} d\mathbb{P}_X$$

$$\approx \sum_{i=1}^{N_{sim}} \left( \frac{1}{N_s} \sum_{k=1}^{N_{sim}} \|x^k - x_i\|_{L^2(T)}^2 1_{V_i}(x^k) \right)$$

then generating a set of codebooks, one for each class. Each class has a representative functional profile which is used for matching a seismic signal to its codebook. The classifier then performs a nearest neighbor search on each of the classes and then within each class codebook the nearest vector to the seismic trace is selected. The index $u_n$ of the nearest vector is transmitted with the class index $i_n$.

The method includes the functional quantizer further comprising a hybrid functional quantizer including a coarse functional quantizer $Q_1$ and a fine residual functional quantizer $Q_2$; performing, by the coarse functional quantizer, error correction of the quantized trace; generating, by the coarse functional quantizer, a quantized seismic trace $\hat{x}n$ and computing the residual of the difference between the seismic trace $x_n$ and the quantized seismic trace $\hat{x}n$; applying the residual to the fine residual functional quantizer to generate a quantized residual $\hat{e}_2$, and summing the quantized residual $\hat{e}_2$ with the quantized seismic trace $\hat{x}n$ to error correct the quantization vector index $u_n$ for each $x_n$.

The fine functional quantizer is one of a recursive functional quantizer, a classified functional quantizer and a multistage functional quantizer.

The quantization may include performing multiple stages of functional quantization, wherein each stage quantizes the residual from the previous stage until the residual is below a predetermined threshold.

The third embodiment is illustrated with respect to FIG. 3A, 3B, 4, 5, 6. The third embodiment describes a non-transitory computer readable medium having instructions stored therein that, when executed by one or more processors, causes the one or more processors to perform a method for data compression of reflected seismic waveforms received from seismic sensors, comprising: generating, by a seismic generator 501, at least one seismic wave 507 into a geological formation 505 and receiving, a plurality of seismic receivers 503, seismic waveforms reflected from discontinuities 508 in the geologic formation; collecting, by a recorder 509 connected to the seismic receivers, the seismic waveforms and generating n seismic traces $x_n$, where n= 1, 2, . . . , n.

The third embodiment further comprises receiving, by a controller 662 connected to the recorder 509, the seismic traces; compressing, by a processor 670 connected to the controller, the seismic traces, wherein the processor compresses each seismic trace by applying each seismic trace to an automatic gain controller, AGC 664, a classifier 666 and a functional quantizer 668 and generating, for each seismic trace, a class index $i_n$, and a quantization vector index $u_n$.

The non-transitory computer readable medium method further comprises generating, by the AGC, a gain value for each trace and encoding, by a gain value encoder 682 connected to the AGC, an encoded gain value, g, for each trace.

The non-transitory computer readable medium method proceeds by transmitting, by the controller, each encoded gain value, g, class index $i_n$, and quantization vector index $u_n$ to a network controller 684; and transmitting, with an antenna 688 connected to the network controller, each encoded gain value g, class index $i_n$, and quantization vector index $u_n$ of the compressed trace to a decoder 686 for reconstruction of each reflected seismic waveform.

Compressing by the processor further includes generating, by the AGC, a gain normalized trace $x_{n_g}$ for each seismic trace $x_n$; receiving, by the classifier, each gain normalized trace and generating a class index $i_n$ for each gain normalized trace; receiving, by a functional quantizer connected to the classifier, each gain normalized trace $x_{n_g}$ and each class index $i_n$; quantizing, by the functional quantizer, each gain normalized trace by applying the gain normalized trace to a vector quantizer having class codebooks $C_1, C_2, \ldots, C_n$ 340, wherein the vector quantizer utilizes the class codebook associated with the class index $i_n$ to quantize the trace $x_{n_g}$ and generate the quantization vector index $u_n$.

The non-transitory computer readable medium method further includes generating the class codebooks 340 of the vector quantizer by applying a known set of training seismic traces $x_t$ to the equation $$\mathbb{P}(\Omega_i) = \int_\Omega 1_{\Omega_i} d\mathbb{P} \approx \frac{1}{N_s} \sum_{k=1}^{N_s} 1_{V_i}(x^k)$$

where $\mathbb{P}(\Omega_i)$ is the probability measure of the sample space $\Omega_i$, $N_s$ equals the number of traces, i=1, 2, ..., N, $1_{\Omega_i}$, $1_{V_i}$ are the unity matrix for the sample space $\Omega_i$ and the voronoi cell $v_i$, and determining the centroids, $x^*_i$, and distortion, $\Delta(\{V_i, x_i\}_{i=1}^N)$ $$x_i^* = \frac{\int_\Omega X 1_{\Omega_i} d\mathbb{P}}{\int_\Omega 1_{\Omega_i} d\mathbb{P}} \approx \frac{\sum_{k=1}^{N_s} x^k 1_{V_i}(x^k)}{\sum_{k=1}^{N_s} 1_{V_i}(x^k)}$$

$$\Delta(\{V_i, x_i\}_{i=1}^N) = \sum_{j=1}^N \int_\Omega \|X - x_i\|_{L^2_T}^2 1_{\Omega_i} d\mathbb{P}_X$$

$$\approx \sum_{i=1}^{N_{sim}} \left( \frac{1}{N_s} \sum_{k=1}^{N_{sim}} \|x^k - x_i\|_{L^2(T)}^2 1_{V_i}(x^k) \right)$$

then generating a set of codebooks, one for each class. Each class has a representative functional profile which is used for matching a seismic signal to its codebook. The classifier then performs a nearest neighbor search on each of the classes and then within each class codebook the nearest vector to the seismic trace is selected. The index $u_n$ of the nearest vector is transmitted with the class index $i_n$.

The non-transitory computer readable medium method includes the functional quantizer further comprising a hybrid functional quantizer including a coarse functional quantizer $Q_1$ and a fine residual functional quantizer $Q_2$; performing, by the coarse functional quantizer, error correction of the quantized trace; generating, by the coarse functional quantizer, a quantized seismic trace x̂n and computing the residual of the difference between the seismic trace $x_n$ and the quantized seismic trace x̂n; applying the residual to the fine residual functional quantizer to generate a quantized residual ê$_2$, and summing the quantized residual ê$_2$ with the quantized seismic trace x̂n to error correct the quantization vector index $u_n$ for each $x_n$.

The fine functional quantizer is one of a recursive functional quantizer, a classified functional quantizer and a multistage functional quantizer.

The quantization may include performing multiple stages of functional quantization, wherein each stage quantizes the residual from the previous stage until the residual is below a predetermined threshold.

Figure 7:
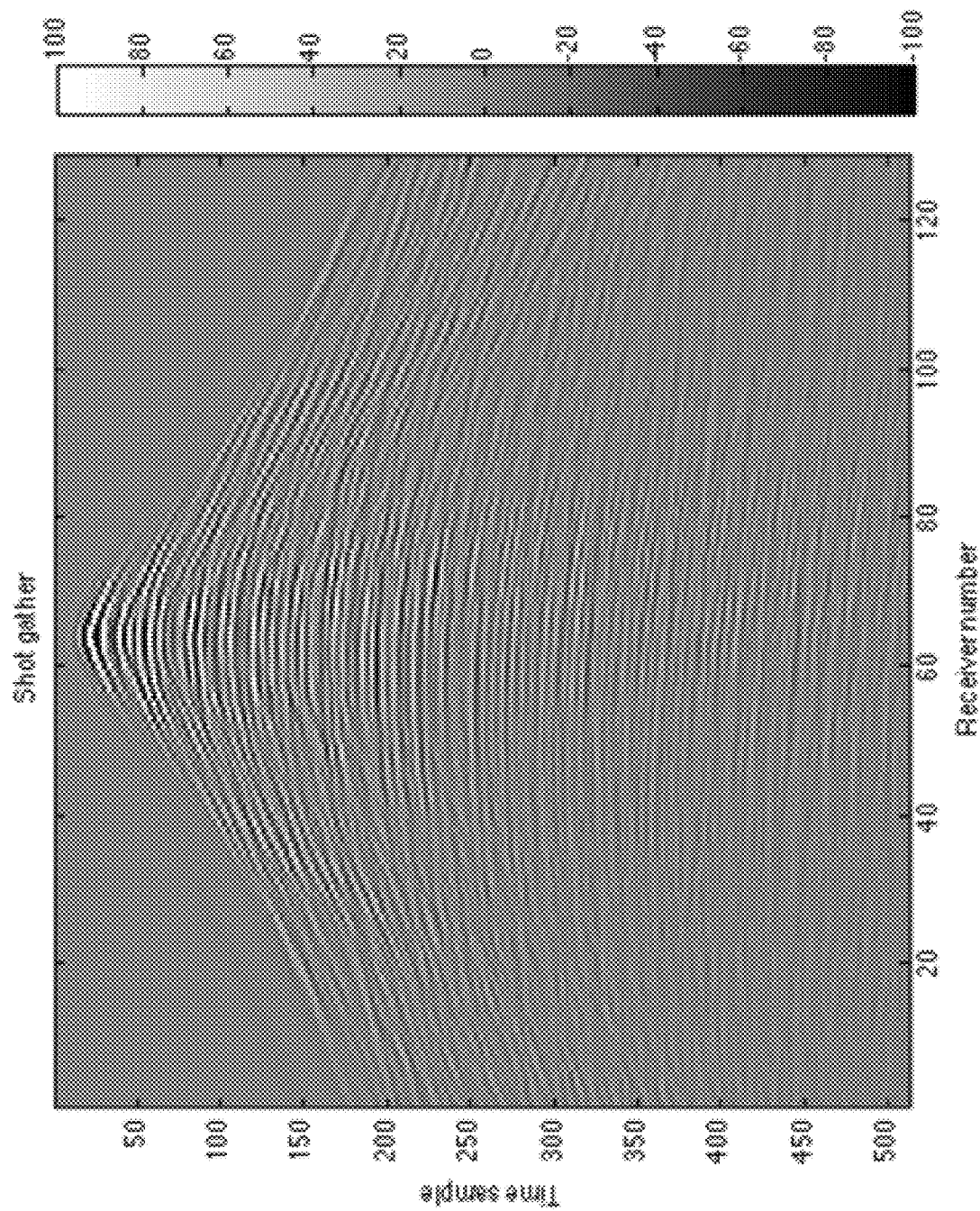
FIG. 7 illustrates a 125×520 image of Seismic Trace Data from a shot gather.
Figure 8A:
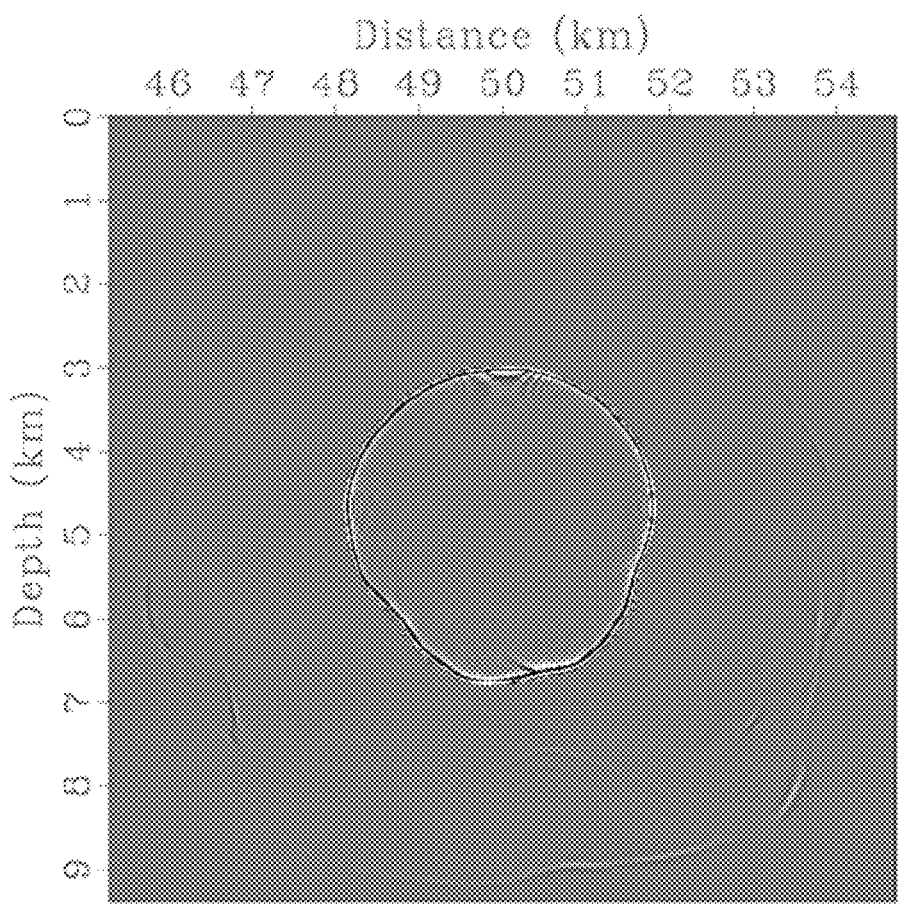
FIG. 8A illustrates one 525×525 slice of a simulated 3D wavefield.
Figure 8B:
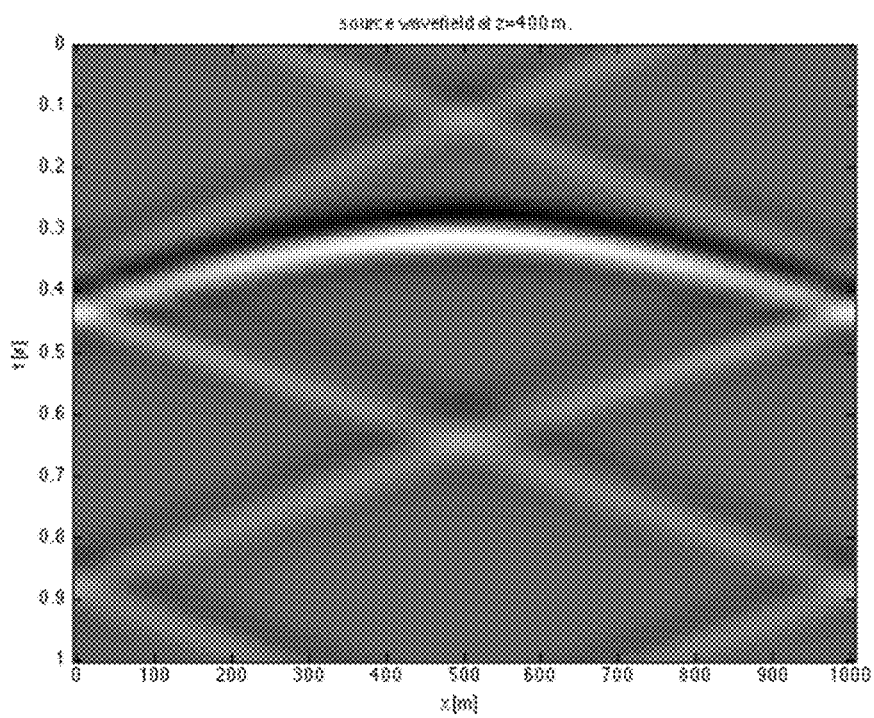
FIG. 8B illustrates one 1000×723 slice of a synthetic 3D wavefield.

The compression schemes were tested on two publicly available seismic data sets and one synthetically generated wavefield. All images have a depth of 32 bits. A seismic trace shot gather image is used as shown in FIG. 7. The 125×520 image is downloadable from http://www.usgs.gov/ (U.S. Geological Survey). FIG. 8A gives a 525×525 two-dimensional snapshot of a simulated 3D seismic wavefield. It has been extracted from the website http://ahay.org/RSF/book/tongji/qswave/paper*html/. FIG. 8B is part of an online exercise in wavefield extrapolation and migration. It is a 1000×723 32 bit image of a synthesized wavefield. It has been extracted from https://www.slim.eos.ubc.ca/Teaching/EOSC454.

Figure 9:
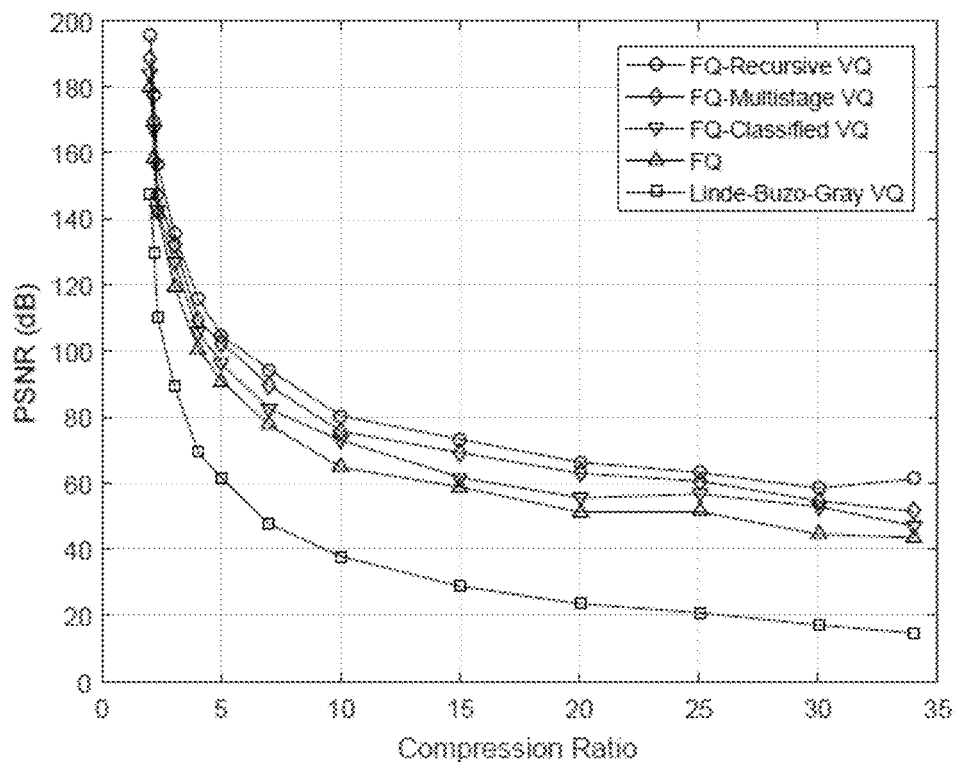
FIG. 9 is a graph illustrating compression performance in terms of PSNR vs. Compression Ratio of the FQ-VQ, FQ and LBG VQ quantizers on trace data.
Figure 10:
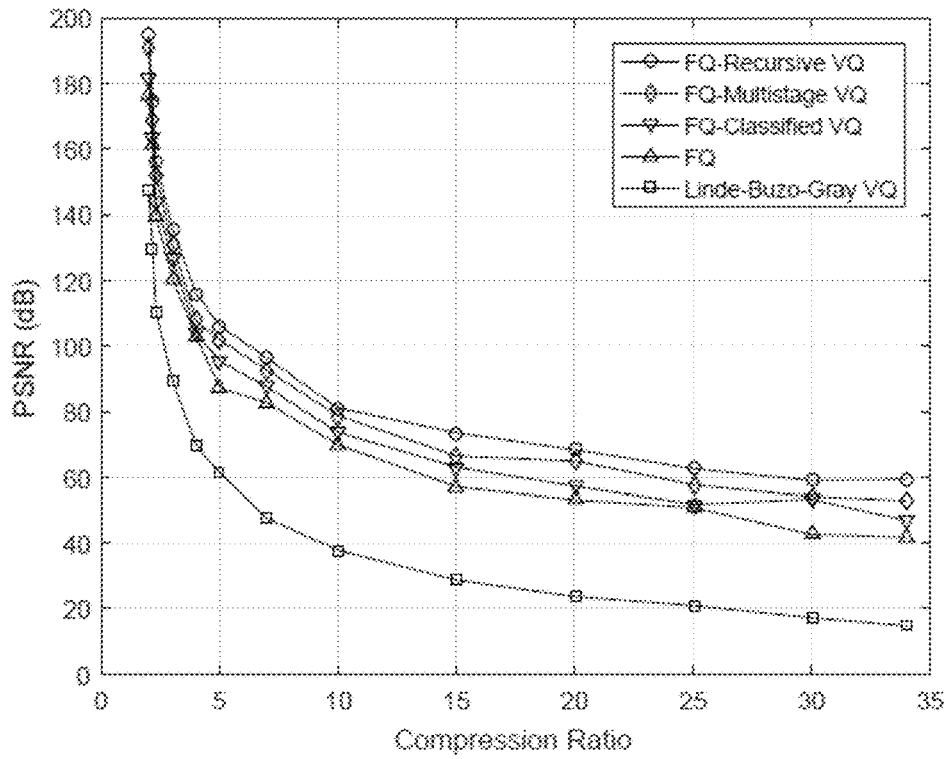
FIG. 10 is a graph illustrating compression performance in terms of PSNR vs.

The results for each wavefield are shown in FIG. 9, 10, 11. FIG. 9 represents the compression result comparisons for the shot gather of FIG. 7. FIG. 10 represents the compression result comparisons from the simulated 3D seismic wavefield of FIG. 8A. FIG. 11 represents the compression result comparisons for the synthesized wavefield of FIG. 8B.

Table 1 gives an overview of the compression performance of the data sets in FIGS. 9, 10 and 11. All four algorithms (FQ, Classified FQ, Multistage FQ and Recursive FQ) are represented in the table. Additionally, for comparison the performance of the standard LBG (Linde-Buzo-Gray) quantization algorithm is shown (See Y. Linde; A. Buzo; R. Gray, "An Algorithm for Vector Quantizer Design", IEEE Transactions on Communications, Volume: 28, Issue: 1, January 1980, incorporated herein by reference in its entirety). The compression ratio used is 20:1. The final compressed size in bytes is also given. The figure of merit for assessing compression performance is Peak SNR (PSNR).

TABLE I

Compression Performance for different schemes on 3 data sets. File size in Bytes, PSNR in dB

| | Trace Data | | Wavefield 1 | | Wavefield 2 | |
|---|---|---|---|---|---|---|
| | Size | PSNR | Size | PSNR | Size | PSNR |
| LBG | 13197 | 21.24 | 55200 | 23.25 | 144699 | 25.5 |
| FQ | 13124 | 51.80 | 55164 | 48.97 | 144679 | 46.68 |
| FQ Classified | 13156 | 56.27 | 55176 | 55.60 | 144653 | 56.89 |
| FQ Multistage | 13132 | 59.55 | 55180 | 60.49 | 144641 | 59.99 |
| FQ Recursive | 13120 | 65.914 | 55124 | 65.39 | 144621 | 69.07 |

The Peak SNR is computed as follows.

Let a(i, j) be the original pixel value in the image to be compressed and let â(i, j) be the reconstructed or decompressed value. Define the MSE (mean square error) as:

$$MSE = \frac{1}{mn} \sum_{i=0}^{i=m-1} \sum_{j=0}^{j=n-1} |a(i,j) = \hat{a}(i,j)|^2$$

then the Peak SNR is given by $$PSNR = 10 \cdot \log_{10}\left(\frac{MAX_I^2}{MSE}\right)$$
$$= 10 \cdot \log_{10}\left(\frac{(2^{32}-1)^2}{MSE}\right)$$

where $MAX_I$ is the maximum possible pixel value of a 32-bit image.

It is seen from Table 1 and FIGS. 9-11 that the enhanced FQ algorithms (FQ Recursive VQ, FQ Multistage VQ, FQ Classified VQ) perform 40 dB or better than the standard LBG quantization algorithm applied to all three images across a wide variation of compression ratio. Further, in each of FIG. 9-11, the FQ-VQ combined performance was better than FQ alone.

In FIG. 12, the relative gain of using the hybrid FQ techniques versus their plain counterparts is plotted. It is seen that a gain of at least 10 dB is obtained as an advantage, (as in the case of FQ-Recursive VQ). For other techniques the gains are higher (20 dB for FQ-Multistage VQ and a little over 20 dB for FQ-Classified VQ).

In Table 2, the total time taken to compress the data set has been presented. It is to be noted that the high compression ratio performance of the FQ scheme and its variants comes at the expense of computational load, with the recursive FQ costing the most. Note that the regularity of the image enables easy compression as can be seen from the fact that wavefields are easier to compress than trace data.

TABLE II

Computational complexity in time (thirds) for different compression schemes

|  | Trace Data | Wavefield 1 | Wavefield 2 |
| --- | --- | --- | --- |
| LBG | 0.50 | 0.09 | 0.08 |
| FQ | 0.60 | 0.1 | 0.1 |
| FQ Classified | 0.70 | 0.12 | 0.13 |
| FQ Multistage | 3.05 | 1.10 | 1.15 |
| FQ Recursive | 8.12 | 2.98 | 2.80 |

The present disclosure describes a high performance seismic data compression scheme based on the concept of functional quantization and its three variants based on previously known quantization paradigms. Results indicate significant performance improvement over standard Linde-Buzo-Gray (LBG) quantizer and improved results over FQ alone. The recursive quantizer-based FQ technique gives the highest compression gains, while multistage or residual FQ and classified FQ gives the third and third highest performance levels respectively. For classified FQ, one disadvantage of this two stage technique is that a separate index indicating the functional quantizer class has to be generated by the encoder so that the corresponding sub codebook is specified for the decoder. This increases the rate requirement for a given distortion level. The advantage of a recursive VQ is that it can be considered as a type of a classified VQ in which the state of the quantizer represents a class. However, the difference between classified VQ and recursive VQ is that the recursive VQ does not send overhead bits as side information to specify the class of a given vector. The decoder on the receiver side decodes the class to which the vector belongs from the its own state. This leads to a powerful paradigm for the optimization of bit rate at a given distortion level.

Next, a hardware description of the controller 662 according to exemplary embodiments is described with reference to FIG. 13. In FIG. 13, the controller described is representative of the controller 662 of FIG. 6, in which the controller is a computing device which includes a CPU 1300 which performs the processes described above/below. The process data and instructions may be stored in memory 1302. These processes and instructions may also be stored on a storage medium disk 1304 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 1300 and an operating system such as Microsoft Windows 7, UNIT, Solaris, LINUX7, Apple MAC-OS and other systems known to those skilled in the art.

The hardware elements in order to achieve the computing device may be realized by various circuitry elements, known to those skilled in the art. For example, CPU 1300 may be a Xenon or Core processor from Intel of America or an Opteron processor from AMD of America, or may be other processor types that would be recognized by one of ordinary skill in the art. Alternatively, the CPU 1300 may be implemented on an FPGA, ASIC, PLD or using discrete logic circuits, as one of ordinary skill in the art would recognize. Further, CPU 1300 may be implemented as multiple processors cooperatively working in parallel to perform the instructions of the inventive processes described above.

The computing device in FIG. 13 also includes a network controller 1306, such as an Intel Ethernet PRO network interface card from Intel Corporation of America, for interfacing with network 1345. As can be appreciated, the network 1345 can be a public network, such as the Internet, or a private network such as an LAN or WAN network, or any combination thereof and can also include PSTN or ISDN sub-networks. The network 1345 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1308, such as a NVIDIA GeForce GT13 or Quadro graphics adaptor from NVIDIA Corporation of America for interfacing with display 1310, such as a Hewlett Packard HPL2445w LCD monitor. A general purpose I/O interface 1312 interfaces with a keyboard and/or mouse 1314 as well as a touch screen panel 1316 on or separate from display 1310. General purpose I/O interface also connects to a variety of peripherals 1318 including printers and scanners, such as an OfficeJet or DeskJet from Hewlett Packard. A sound controller 1320 is also provided in the computing device such as Sound Blaster 13-Fi Titanium from Creative, to interface with speakers/microphone 1322 thereby providing sounds and/or music.

The general purpose storage controller 1324 connects the storage medium disk 1304 with communication bus 1326, which may be an ISA, EISA, VESA, PCI, or similar, for interconnecting all of the components of the computing device. A description of the general features and functionality of the display 1310, keyboard and/or mouse 1314, as well as the display controller 1308, storage controller 1324, network controller 1306, sound controller 1320, and general purpose I/O interface 1312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 14.

FIG. 14 shows a schematic diagram of a data processing system, according to certain embodiments, for performing the functions of the exemplary embodiments. The data processing system is an example of a computer in which code or instructions implementing the processes of the illustrative embodiments may be located.

In FIG. 14, data processing system 1400 employs a hub architecture including a north bridge and memory controller hub (NB/MCH) 1425 and a south bridge and input/output (I/O) controller hub (SB/ICH) 1420. The central processing unit (CPU) 1430 is connected to NB/MCH 1425. The NB/MCH 1425 also connects to the memory 1445 via a memory bus, and connects to the graphics processor 1450 via an accelerated graphics port (AGP). The NB/MCH 1425 also connects to the SB/ICH 1420 via an internal bus (e.g., a unified media interface or a direct media interface). The CPU Processing unit 1430 may contain one or more processors and even may be implemented using one or more heterogeneous processor systems.

For example, FIG. 15 shows one implementation of CPU 1430. In one implementation, the instruction register 1538 retrieves instructions from the fast memory 1540. At least part of these instructions are fetched from the instruction register 1538 by the control logic 1536 and interpreted according to the instruction set architecture of the CPU 830. Part of the instructions can also be directed to the register 1532. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1534 that loads values from the register 1532 and performs logical and mathematical operations on the loaded values according to the instructions. The results from these operations can be feedback into the register and/or stored in the fast memory 1540.

According to certain implementations, the instruction set architecture of the CPU 1430 can use a reduced instruction set architecture, a complex instruction set architecture, a vector processor architecture, a very large instruction word architecture. Furthermore, the CPU 1430 can be based on the Von Neuman model or the Harvard model. The CPU 1430 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 14, the data processing system 1400 can include that the SB/ICH 1420 is coupled through a system bus to an I/O Bus, a read only memory (ROM) 1456, universal serial bus (USB) port 1464, a flash binary input/output system (BIOS) 1468, and a graphics controller 1458. PCI/PCIe devices can also be coupled to SB/ICH 1420 through a PCI bus 1462.

The PCI devices may include, for example, Ethernet adapters, add-in cards, and PC cards for notebook computers. The Hard disk drive 1460 and CD-ROM 1466 can use, for example, an integrated drive electronics (IDE) or serial advanced technology attachment (SATA) interface. In one implementation the I/O bus can include a super I/O (SIO) device.

Further, the hard disk drive (HDD) 1460 and optical drive 1466 can also be coupled to the SB/ICH 1420 through a system bus. In one implementation, a keyboard 1470, a mouse 1472, a parallel port 1478, and a serial port 1476 can be connected to the system bus through the I/O bus. Other peripherals and devices that can be connected to the SB/ICH 1420 using a mass storage controller such as SATA or PATA, an Ethernet port, an ISA bus, a LPC bridge, Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 16, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A system for data compression of reflected seismic waveforms received from seismic sensors, comprising:
   at least one seismic generator for emitting seismic waves into a geological formation;
   a plurality of seismic receivers, wherein each seismic receiver receives seismic waveforms reflected from discontinuities in the geologic formation;
   a recorder connected to the plurality of seismic receivers, wherein the recorder collects the seismic waveforms from each seismic receiver and generates n seismic traces $x_n$, where n=1, 2, . . . , n;

a control system including
   a controller connected to the recorder,
   a memory connected to the controller and including program instructions for compressing the seismic traces;
   a processor connected to the controller, wherein the processor is further connected to the memory to access the program instructions;
   an automatic gain control (AGC) connected to the processor;
   a classifier connected to the AGC;
   a gain value encoder connected to the AGC;
   a functional quantizer connected to the classifier;
   a network controller connected to the controller;
   an antenna connected to the network controller;
   wherein the controller has circuitry configured to receive each seismic trace $x_n$ and instruct the processor to compress each seismic trace;
   wherein the processor compresses each seismic trace by applying each seismic trace to the AGC, the classifier and the functional quantizer to generate, for each seismic trace, a class index $i_n$, and a quantization vector index $u_n$;
   wherein the AGC transmits each gain value to the gain value encoder which generates an encoded gain value, g;
   wherein the controller transmits each encoded gain value, g, class index $i_n$, and quantization vector index $u_n$ to the network controller; and
   wherein the network controller causes the antenna to transmit each encoded gain value g, class index $i_n$, and quantization vector index $u_n$ of the compressed trace to a decoder for reconstruction of each reflected seismic waveform.

2. The system for data compression of reflected seismic waveforms received from seismic sensors of claim 1, wherein compression by the processor includes
   wherein the AGC generates a gain normalized seismic trace $x_{n_g}$;
   wherein the classifier generates the class index, $i_n$;
   wherein the functional quantizer includes a vector quantizer having class codebooks, and wherein the vector quantizer utilizes the class codebook associated with the class index $i_n$ to quantize the trace $x_{n_g}$ and generate the quantization vector index $u_n$.

3. The system for data compression of reflected seismic waveforms received from seismic sensors of claim 2, further comprising
   wherein the functional quantizer is a hybrid functional quantizer including a coarse functional quantizer and a fine residual functional quantizer to perform error correction;
   wherein the coarse functional quantizer generates a quantized seismic trace x̂n and computes the residual of the difference between the seismic trace $x_n$ and the quantized seismic trace x̂n; applies the residual to the residual fine functional quantizer to generate a quantized residual $ê_2$;
   wherein the quantized residual $ê_z$ is summed with the quantized seismic trace x̂n to error correct the quantization vector index $u_n$ for each $x_n$.

4. The system for data compression of reflected seismic waveforms received from seismic sensors of claim 3, further comprising
   wherein the functional quantizer is one of a recursive functional quantizer, a classified functional quantizer and a multistage functional quantizer.

5. The system for data compression of reflected seismic waveforms received from seismic sensors of claim 2, further comprising
   wherein the class codebooks of the vector quantizer are generated by applying a known set of training seismic traces $x_i$ to the equation $$\mathbb{P}(\Omega_i) = \int_\Omega 1_{\Omega_i} d\mathbb{P} \approx \frac{1}{N_s} \sum_{k=1}^{N_s} 1_{V_i}(x^k)$$

where $\mathbb{P}(\Omega_i)$ is the probability measure of a sample space $\Omega_i$, $N_s$ equals the number of traces, i=1, 2, ..., N, $1_{\Omega_i}$, $1_{V_i}$ are the unity matrix for the sample space $\Omega_i$ and a voronoi cell $v_i$;
determining the centroids, $x^*_i$, and distortion, $\Delta(\{V_i, x_i\}_{i=1}^N)$, such that $$x_i^* = \frac{\int_\Omega X 1_{\Omega_i} d\mathbb{P}}{\int_\Omega 1_{\Omega_i} d\mathbb{P}} \approx \frac{\sum_{k=1}^{N_s} x^k 1_{V_i}(x^k)}{\sum_{k=1}^{N_s} 1_{V_i}(x^k)}$$

$$\Delta(\{V_i, x_i\}_{i=1}^N) = \sum_{j=1}^N \int_\Omega \|X - x_i\|_{L^2(\mathcal{T})}^2 1_{\Omega_i} d\mathbb{P} x$$
$$\approx \sum_{i=1}^{N_{sim}} \left( \frac{1}{N_s} \sum_{k=1}^{N_{sim}} \|x^k - x_i\|_{L^2(\mathcal{T})}^2 1_{V_i}(x^k) \right);$$

generating a set of codebooks, one for each class;
matching a seismic signal to its codebook;
performing a nearest neighbor search on each class;
selecting the nearest vector to the seismic trace within each codebook; and
transmitting the index $u_n$, of the nearest vector with the class index $i_n$.

6. The system for data compression of reflected seismic waveforms received from seismic sensors of claim 2, further comprising
   wherein the fine functional quantizer comprises multiple stages of functional quantization, wherein each stage quantizes the residual from the previous stage until the residual is below a predetermined threshold.

7. The system for data compression of reflected seismic waveforms received from seismic sensors of claim 1, further comprising
   wherein the seismic generator is at least one of a shot source, a vibrator on a vibrator truck, an explosive device, a water gun, an air gun, and a vapor gun,
   wherein the seismic receiver is at least one of a geophone, a seismometer, a microphone, a particle velocity sensor, a water pressure sensor, a particle displacement sensor, a particle acceleration sensor and a pressure gradient sensor.

8. A method for data compression of reflected seismic waveforms received from seismic sensors, comprising
   generating, by a seismic generator, at least one seismic wave into a geological formation;
   receiving, a plurality of seismic receivers, seismic waveforms reflected from discontinuities in the geologic formation;

collecting, by a recorder connected to the seismic receivers, the seismic waveforms and generating n seismic traces $x_n$, where n=1, 2, ..., n;

receiving, by a controller connected to the recorder, the seismic traces;

compressing, by a processor connected to the controller, the seismic traces, wherein the processor compresses each seismic trace by applying each seismic trace to an automatic gain controller, AGC, a classifier and a functional quantizer and generating, for each seismic trace, a class index $i_n$, and a quantization vector index $u_n$;

generating, by the AGC, a gain value for each trace;

encoding, by a gain value encoder connected to the AGC, an encoded gain value, g, for each trace;

transmitting, by the controller, each encoded gain value, g, class index $i_n$, and quantization vector index $u_n$ to a network controller; and transmitting, with an antenna connected to the network controller, each encoded gain value g, class index $i_n$, and quantization vector index $u_n$ of the compressed trace to a decoder for reconstruction of each reflected seismic waveform.

9. The method for data compression of reflected seismic waveforms received from seismic sensors of claim 8, wherein compressing by the processor further includes generating, by the AGC, a gain normalized trace $x_{n_g}$ for each seismic trace $x_n$;

receiving, by the classifier, each gain normalized trace and generating a class index $i_n$ for each gain normalized trace;

receiving, by a functional quantizer connected to the classifier, each gain normalized trace $x_{n_g}$ and each class index $i_n$;

quantizing, by the functional quantizer, each gain normalized trace by applying the gain normalized trace to a vector quantizer having class codebooks, wherein the vector quantizer utilizes the class codebook associated with the class index $i_n$ to quantize the trace $x_{n_g}$ and generate the quantization vector index $u_n$.

10. The method for data compression of reflected seismic waveforms received from seismic sensors of claim 9, further comprising generating the class codebooks of the vector quantizer by applying a known set of training seismic traces $x_t$ to the wherein the class codebooks of the vector quantizer are generated by applying a known set of training seismic traces $x_t$ to the equation $$\mathbb{P}(\Omega_i) = \int_\Omega 1_{\Omega_i} d\mathbb{P} \approx \frac{1}{N_s} \sum_{k=1}^{N_s} 1_{V_i}(x^k)$$

where $\mathbb{P}(\Omega_i)$ is the probability measure of a sample space $\Omega_i$, $N_s$ equals the number of traces, i=1, 2, ..., N, $1_{\Omega_i}$, $1_{v_j}$ are the unity matrix for the sample space $\Omega_i$ and a voronoi cell $v_i$;

determining the centroids, $x^*_i$, and distortion, $\Delta(\{V_i, x_i\}_{i=1}^N)$, such that $$x_i^* = \frac{\int_\Omega X 1_{\Omega_i} d\mathbb{P}}{\int_\Omega 1_{\Omega_i} d\mathbb{P}} \approx \frac{\sum_{k=1}^{N_s} x^k 1_{V_i}(x^k)}{\sum_{k=1}^{N_s} 1_{V_i}(x^k)}$$

$$\Delta(\{V_i, x_i\}_{i=1}^N) = \sum_{j=1}^N \int_\Omega \|X - x_i\|^2_{L^2(\mathcal{T})} 1_{\Omega_i} d\mathbb{P}_X$$

$$\approx \sum_{i=1}^{N_{sim}} \left( \frac{1}{N_s} \sum_{k=1}^{N_{sim}} \|x^k - x_i\|^2_{L^2(\mathcal{T})} 1_{V_i}(x^k) \right);$$

generating a set of codebooks, one for each class;

matching a seismic signal to its codebook;

performing a nearest neighbor search on each class;

selecting the nearest vector to the seismic trace within each codebook; and transmitting the index $u_n$ of the nearest vector with the class index $i_n$.

11. The method for data compression of reflected seismic waveforms received from seismic sensors of claim 10, the functional quantizer further comprising a hybrid functional quantizer including a coarse functional quantizer and a fine residual functional quantizer;

performing, by the coarse functional quantizer, error correction of the quantized trace;

generating, by the coarse functional quantizer, a quantized seismic trace $\hat{x}n$ and computing the residual of the difference between the seismic trace $x_n$ and the quantized seismic trace $\hat{x}n$;

applying the residual to the fine residual functional quantizer to generate a quantized residual $\hat{e}_2$, and summing the quantized residual $\hat{e}_2$ with the quantized seismic trace $\hat{x}n$ to error correct the quantization vector index $u_n$ for each $x_n$.

12. The method for data compression of reflected seismic waveforms received from seismic sensors of claim 11, wherein the fine functional quantizer is one of a recursive functional quantizer, a classified functional quantizer and a multistage functional quantizer.

13. The method for data compression of reflected seismic waveforms received from seismic sensors of claim 11, further comprising performing multiple stages of functional quantization, wherein each stage quantizes the residual from the previous stage until the residual is below a predetermined threshold.

14. A non-transitory computer readable medium having instructions stored therein that, when executed by one or more processors, causes the one or more processors to perform a method for data compression of reflected seismic waveforms received from seismic sensors, comprising:

generating, by a seismic generator, at least one seismic wave into a geological formation;

receiving, a plurality of seismic receivers, seismic waveforms reflected from discontinuities in the geologic formation;

collecting, by a recorder connected to the seismic receivers, the seismic waveforms and generating n seismic traces $x_n$, where n=1, 2, ..., n;

receiving, by a controller connected to the recorder, the seismic traces;

compressing, by a processor connected to the controller, the seismic traces, wherein the processor compresses each seismic trace by applying each seismic trace to an automatic gain controller, AGC, a classifier and a functional quantizer and generating, for each seismic trace, a class index, and a quantization vector index;

generating, by the AGC, a gain value for each trace;

encoding, by a gain value encoder connected to the AGC, an encoded gain value, g, for each trace;

transmitting, by the controller, each encoded gain value, g, class index $i_n$, and quantization vector index $u_n$ to a network controller; and transmitting, with an antenna connected to the network controller, each encoded gain value g, class index $i_n$, and quantization vector index $u_n$ of the compressed trace to a decoder for reconstruction of each reflected seismic waveform.

15. The non-transitory computer readable medium method of claim 14, wherein compressing by the processor further includes generating, by the AGC, a gain normalized trace $x_{n_g}$ for each seismic trace $x_n$;

receiving, by the classifier, each gain normalized trace and generating a class index $i_n$ for each gain normalized trace;

receiving, by a functional quantizer connected to the classifier, each gain normalized trace $x_{n_g}$ and each class index $i_n$;

quantizing, by the functional quantizer, each gain normalized trace by applying the gain normalized trace to a vector quantizer having class codebooks, wherein the vector quantizer utilizes the class codebook associated with the class index $i_n$ to quantize the trace $x_{n_g}$ and generate the quantization vector index $u_n$.

16. The non-transitory computer readable medium method of claim 15, further comprising generating the class codebooks of the vector quantizer by applying a known set of training seismic traces $x_t$ to the wherein the class codebooks of the vector quantizer are generated by applying a known set of training seismic traces $x_t$ to the equation $$\mathbb{P}(\Omega_i) = \int_\Omega 1_{\Omega_i} d\mathbb{P} \approx \frac{1}{N_s} \sum_{k=1}^{N_s} 1_{V_i}(x^k)$$

where $\mathbb{P}(\Omega_i)$ is the probability measure of a sample space $\Omega_i$, $N_s$ equals the number of traces, $i=1, 2, \ldots, N$, $1_{\Omega_i}$, $1_{V_i}$ are the unity matrix for the sample space $\Omega_i$ and a voronoi cell $v_i$;

determining the centroids, $x^*_i$, and distortion, $\Delta(\{V_i, x_i\}_{i=1}^N)$, such that $$x_i^* = \frac{\int_\Omega X 1_{\Omega_i} d\mathbb{P}}{\int_\Omega 1_{\Omega_i} d\mathbb{P}} \approx \frac{\sum_{k=1}^{N_s} x^k 1_{V_i}(x^k)}{\sum_{k=1}^{N_s} 1_{V_i}(x^k)}$$

$$\Delta(\{V_i, x_i\}_{i=1}^N) = \sum_{j=1}^N \int_\Omega \|X - x_i\|_{L^2(\mathcal{T})}^2 1_{\Omega_i} d\mathbb{P}_X$$

$$\approx \sum_{i=1}^{N_{sim}} \left( \frac{1}{N_s} \sum_{k=1}^{N_{sim}} \|x^k - x_i\|_{L^2(\mathcal{T})}^2 1_{V_i}(x^k) \right);$$

generating a set of codebooks, one for each class;

matching a seismic signal to its codebook;

performing a nearest neighbor search on each class;

selecting the nearest vector to the seismic trace within each codebook; and transmitting the index $u_n$ of the nearest vector with the class index $i_n$.

17. The non-transitory computer readable medium method of claim 16, the functional quantizer further comprising a hybrid functional quantizer including a coarse functional quantizer and a fine residual functional quantizer;

performing, by the coarse functional quantizer, error correction of the quantized trace;

generating, by the coarse functional quantizer, a quantized seismic trace x̂n and computing the residual of the difference between the seismic trace $x_n$ and the quantized seismic trace x̂n;

applying the residual to the fine residual functional quantizer to generate a quantized residual $ê_2$, and summing the quantized residual $ê_2$ with the quantized seismic trace x̂n to error correct the quantization vector index $u_n$ for each $x_n$.

18. The non-transitory computer readable medium method of claim 16, further comprising wherein the fine functional quantizer is one of a recursive functional quantizer, a classified functional quantizer and a multistage functional quantizer.

19. The non-transitory computer readable medium method of claim 17, further comprising performing multiple stages of functional quantization, wherein each stage quantizes the residual from the previous stage until the residual is below a predetermined threshold.

20. The non-transitory computer readable medium method of claim 14, further comprising generating the seismic wave by at least one of a shot source, a vibrator on a vibrator truck, an explosive device, a water gun, an air gun, and a vapor gun, receiving the reflected seismic wave by at least one of a geophone, a seismometer, a microphone, a particle velocity sensor, a water pressure sensor, a particle displacement sensor, a particle acceleration sensor and a pressure gradient sensor.

\* \* \* \* \*